United States Patent
Nishio et al.

(10) Patent No.: US 12,065,036 B2
(45) Date of Patent: Aug. 20, 2024

(54) VEHICLE AND METHOD FOR CONTROLLING ELECTRONIC BUSINESS TRANSACTION SYSTEM

(71) Applicant: PANASONIC INTELLECTUAL PROPERTY MANAGEMENT CO., LTD., Osaka (JP)

(72) Inventors: Tsuyoshi Nishio, Chiba (JP); Naoki Usui, Kanagawa (JP); Takuma Masuda, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 18/080,890

(22) Filed: Dec. 14, 2022

(65) Prior Publication Data

US 2023/0114316 A1 Apr. 13, 2023

Related U.S. Application Data

(63) Continuation of application No. 16/519,537, filed on Jul. 23, 2019, now abandoned.

(30) Foreign Application Priority Data

Jul. 24, 2018 (JP) .................................. 2018-138753
Jul. 24, 2018 (JP) .................................. 2018-138754
Jul. 24, 2018 (JP) .................................. 2018-138755

(51) Int. Cl.
*B60K 35/00* (2024.01)
*B60K 35/10* (2024.01)
(Continued)

(52) U.S. Cl.
CPC .............. *B60K 35/00* (2013.01); *B60K 35/10* (2024.01); *B60K 35/213* (2024.01); *B60K 35/22* (2024.01);
(Continued)

(58) Field of Classification Search
None
See application file for complete search history.

(56) References Cited

U.S. PATENT DOCUMENTS

| 10,656,777 B1 | 5/2020 | Boulanger |
| 2002/0054440 A1 | 5/2002 | Akamine et al. |

(Continued)

FOREIGN PATENT DOCUMENTS

| JP | 2001-331132 A | 11/2001 |
| JP | 2002-321828 A | 11/2002 |

(Continued)

OTHER PUBLICATIONS

Ryo Sato, *BMW Cars Connect with Cortana and Amazon Prime*, PC Watch (Online), dated Jan. 7, 2017, along with an English translation thereof.

(Continued)

*Primary Examiner* — James J Lee
*Assistant Examiner* — Andrew Sang Kim
(74) *Attorney, Agent, or Firm* — GREENBLUM & BERNSTEIN, P.L.C.

(57) ABSTRACT

A vehicle includes a vehicle body having a cabin, a first seat and a second seat arranged in the cabin, a planar transparent member placed on a side surface of the cabin, and that separates an interior of the cabin and a vehicle exterior from each other, and a display device placed on the side surface of the cabin and arranged along the planar transparent member, the display device having a plurality of pixels. At least a part of the display device is placed on the side surface and between the first seat and the second seat.

19 Claims, 13 Drawing Sheets

(51) Int. Cl.
  *B60K 35/21* (2024.01)
  *B60K 35/22* (2024.01)
  *B60K 35/60* (2024.01)
(52) U.S. Cl.
  CPC ...... *B60K 35/60* (2024.01); *B60K 2360/1438* (2024.01); *B60K 2360/77* (2024.01)

(56) References Cited

U.S. PATENT DOCUMENTS

| | | |
|---|---|---|
| 2003/0142057 A1 | 7/2003 | Niiyama et al. |
| 2006/0155429 A1 | 7/2006 | Boone et al. |
| 2009/0015740 A1* | 1/2009 | Sagitov ............... B60J 3/04 349/16 |
| 2011/0163866 A1* | 7/2011 | Ghannam ............ B60J 3/04 340/449 |
| 2012/0176776 A1 | 6/2012 | Van Herpen et al. |
| 2014/0355285 A1 | 12/2014 | Yamato |
| 2015/0097389 A1* | 4/2015 | Dryselius ............ G02F 1/13338 296/97.2 |
| 2015/0328989 A1 | 11/2015 | Ishikawa et al. |
| 2016/0318379 A1 | 11/2016 | Okuda et al. |
| 2016/0369515 A1 | 12/2016 | Van Herpen et al. |
| 2018/0011359 A1 | 1/2018 | De Jong et al. |
| 2018/0149907 A1 | 5/2018 | Gahagan et al. |
| 2019/0071009 A1 | 3/2019 | Yamato |
| 2019/0113776 A1* | 4/2019 | Ibrahim ............... B60J 3/04 |

FOREIGN PATENT DOCUMENTS

| | | |
|---|---|---|
| JP | 2004-084272 A | 3/2004 |
| JP | 2004-163837 A | 6/2004 |
| JP | 2006-321336 A | 11/2006 |
| JP | 2007-076452 A | 3/2007 |
| JP | 2007-213309 A | 8/2007 |
| JP | 2008-120142 A | 5/2008 |
| JP | 2009-018747 A | 1/2009 |
| JP | 2009-096380 A | 5/2009 |
| JP | 2010-149958 A | 7/2010 |
| JP | 2013-506245 A | 2/2013 |
| JP | 2015-070877 A | 4/2015 |
| JP | 2015-072306 A | 4/2015 |
| JP | 2015-79453 A | 4/2015 |
| JP | 2015-215322 A | 12/2015 |
| JP | 2016-088187 A | 5/2016 |
| JP | 2016-215743 A | 12/2016 |
| JP | 2018-507471 A | 3/2018 |
| JP | 2018-526663 A | 9/2018 |
| WO | WO 2013/081070 A1 | 6/2013 |
| WO | 2015/098312 A1 | 7/2015 |
| WO | WO 2016/196540 A1 | 12/2016 |

OTHER PUBLICATIONS

Office Action issued in Japanese Counterpart Patent Appl. No. 2018-138754, dated Apr. 26, 2022, along with an English translation thereof.

Office Action issued in Japanese Counterpart Patent Appl. No. 2018-138755, dated Oct. 4, 2022, along with an English translation thereof.

Mcilroy, John, "A Futuristic Ride in Mercedes' Self-Driving Car." CNN, Cable News Network, Aug. 4, 2017, https://www.cnn.com/style/article/mercedes-benz-f015/index.html (Year: 2017).

Tesla. "The Model S 17" Touchscreen Display." Youtube, Mar. 23, 2013, https://www.youtube.com/watch?v=TZ0HsN-tblo. (Year: 2013).

Opposition issued in Japanese Counterpart Patent Appl. No. 2018-138753, dated Jul. 4, 2023, along with an English translation thereof.

Evidence Statement issued in Japanese Counterpart Patent Appl. No. 2018-138753, dated May 18, 2020, along with an English translation thereof.

Notice of Reasons for Revocation issued in Japanese Counterpart Patent Appl. No. 2018-138753, dated Aug. 15, 2023, along with an English translation thereof.

A futuristic ride in Mercedes' self-driving car, https://edition.cnn.com/style/article/mercedes-benz-f015/index.html, dated Aug. 9, 2017.

Notification establishing details of safety standards for road transport vehicles (Mar. 29, 2010), https://www.mlit.go.jp/jidosha/kijyun/saimokukokuji/saikoku_195_00.pdf , along with an English translation thereof.

Video viewing result report, https://www.youtube.com/watch?v=TZ0HsN-tblo, https://www.youtube.com/watch?v=IWB4xj7EILg dated May 17, 2020, along with an English translation thereof.

Kazutaka Hanaoka, et al., Transparent Liquid Crystal Display with Three States: Transparent, White and Black, ITE Technical Report vol. 40, No. 13, IDY2016-21 (Mar. 2016), https://www.jstage.jst.go.jp/article/itetr/40.13/0/40.13_21/_pdf/-char/ja , along with an English abstract thereof.

Sumita Optical Glass Inc., webpage, https://glassfab.com/mp-content/uploads/2015/08/Sumita_Optical.pdf , dated Apr. 19, 2011.

Hiroyuki Mae, "Dynamic Tensile Behavior and Light Transmittance of Cyclo-Olefine polymer/Clay Composites", Journal of the Society of Materials Science, Japan, vol. 58, No. 11, pp. 895-902, Nov. 2009, https://www.jstage.jst.go.jp/article/jsms/58/11/58_11_8.

Japansensor Corporation web page, https://www.japansensor.co.jp/faq/959/index.html, dated May 17, 2020, along with an English translation thereof.

Archive of Japansensor Corporation web page, https://web.archive.org/web/20171012222951/https://www.japansensor.co.jp/faq/959/index.html , dated Oct. 12, 2017, along with an English translation thereof.

Wikipedia web page on Fresnel's equation, https://ja.wikipedia.org/wiki/%E3%83%95%E3%83%AC%E3%83%8D%E3%83%AB%E3%81%AE%E5%BC%8F , dated May 17, 2020, along with an English translation thereof.

Notice of submission of written opinion issued in Japanese Counterpart Patent Appl. No. 2018-138753, dated Feb. 26, 2024, along with an English translation thereof.

\* cited by examiner

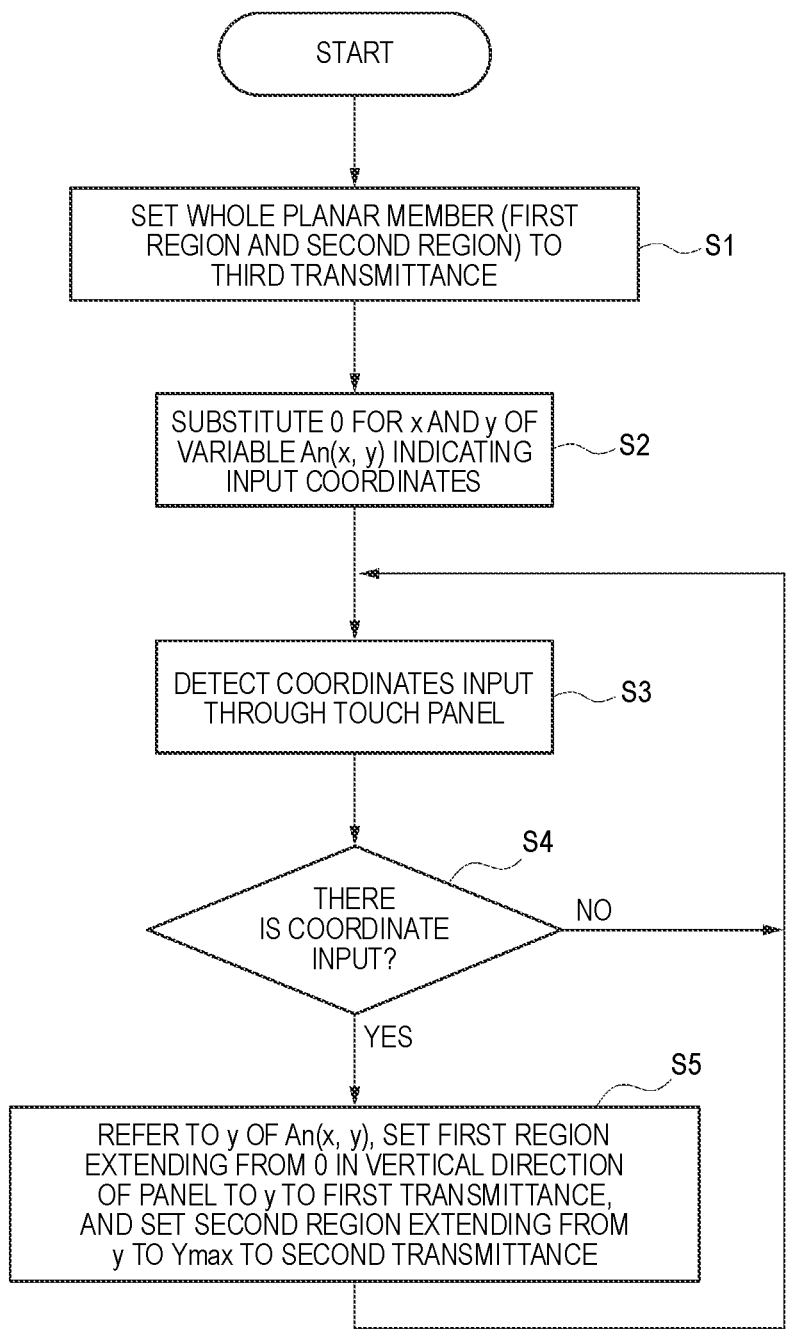

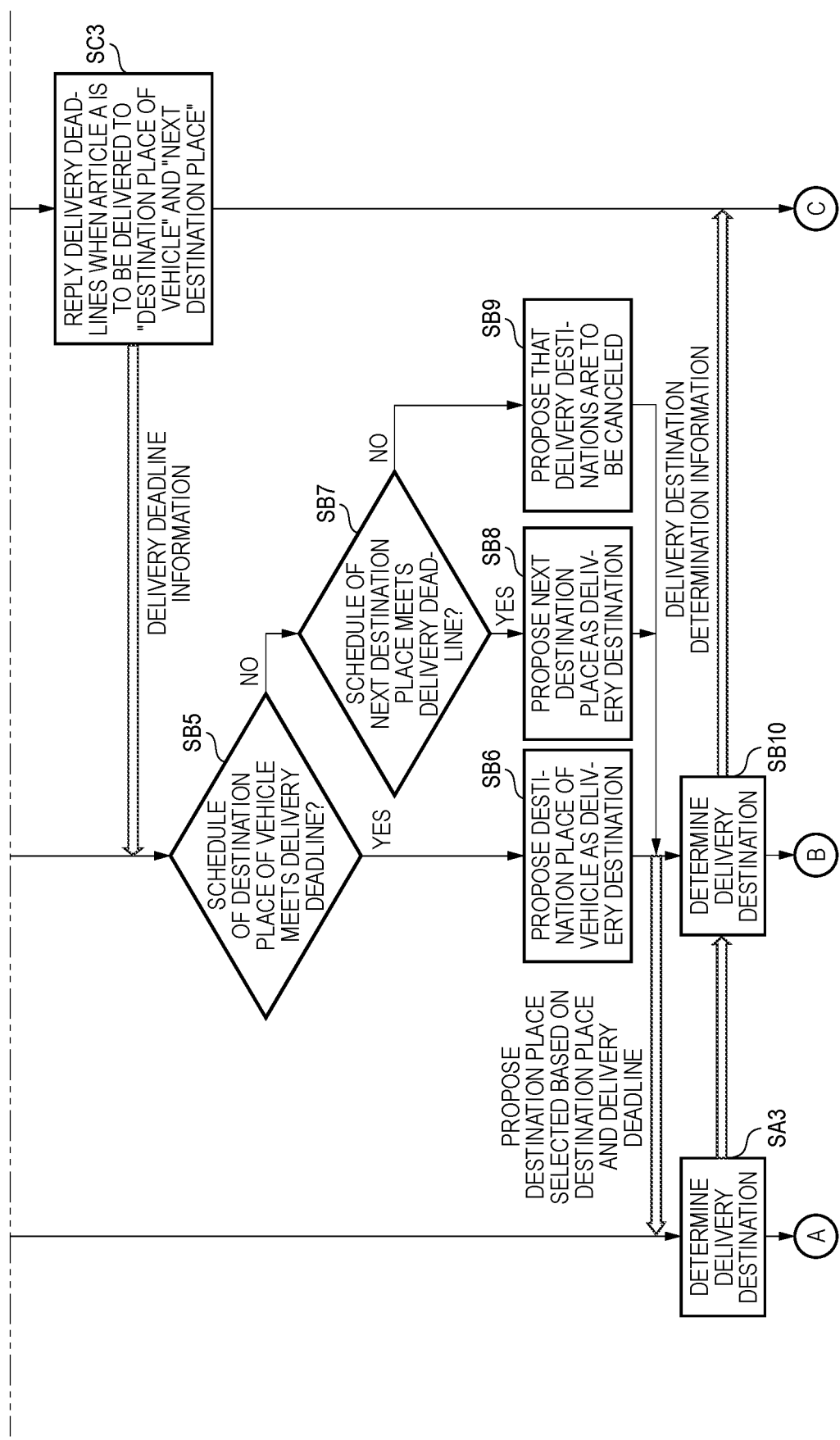

VEHICLE AND METHOD FOR CONTROLLING ELECTRONIC BUSINESS TRANSACTION SYSTEM

CROSS REFERENCE TO RELATED APPLICATIONS

The present application is a Continuation application of U.S. application Ser. No. 16/519,537, filed Jul. 23, 2019, which claims priority to Japanese Patent Application No. 2018-138753 filed on Jul. 24, 2018, Japanese Patent Application No. 2018-138754 filed on Jul. 24, 2018, and Japanese Patent Application No. 2018-138755 filed on Jul. 24, 2018, all the contents of which are expressly incorporated herein by reference in their entireties.

BACKGROUND OF THE INVENTION

1. Field of the Invention

This disclosure relates to a vehicle such as an automobile, and a method for controlling an electronic business transaction system.

The disclosure relates to the vehicle that was exhibited by Panasonic Corporation in CES 2018 held from January 9 to 12, 2018 in Las Vegas, Nevada, USA.

2. Description of the Related Art

Recently, as a technique for providing visual information by using a display in a vehicle such as an automobile, for example, known is a display device that is disclosed in JP-A-2001-331132. The display device is disposed in an instrument panel of a vehicle, and configured so as to, when in used, provide necessary visual information through the display, and, when not in used, make the display as if it does not exist.

In the display device disclosed in JP-A-2001-331132, the object is to provide the driver with information, and the display can be effectively viewed from the driver seat. If it is configured so that the display can be effectively viewed also from seats other than the driver seat, in the case of an automated vehicle, for example, all passengers boarding the vehicle can view the display, and therefore it can be said that the configuration is very effective. It is desired to develop a display device in which a display can be effectively viewed from a plurality of seats. In the case of a railway vehicle, if the vehicle is a passenger car, all passengers boarding the car can view the display similarly with the case of an automated vehicle.

As a conventional technique for, in a vehicle such as an automobile, allowing a person boarding the vehicle (hereinafter, such a person is referred to as an occupant) to make an electronic business transaction, for example, known are an in-vehicle electronic business transaction device and electronic business transaction system that are disclosed in JP-A-2007-213309. The in-vehicle electronic business transaction device and electronic business transaction system are configured so as to provide guidance information for guiding a vehicle to the delivery destination of the purchased article.

In the case where an electronic business transaction can be made in a vehicle, a situation sometimes occurs where the ordered article is to be received at the delivery destination or en route. Even when such a reception is allowed, it is not clear whether the delivery deadline can be met or not. The in-vehicle electronic business transaction device and electronic business transaction system disclosed in JP-A-2007-213309 notify an occupant of information for guiding the vehicle to a fueling station, and cannot efficiently indicate the delivery destination of an article on an electronic business transaction.

As a conventional technique for, in a vehicle such as an automobile, blocking external light (such as sunlight), for example, known is a vehicle antidazzle device that is disclosed in JP-A-2007-76452. In the vehicle antidazzle device, an incident region on which sunlight is incident is estimated, and, based on the estimated incident region and the current position of a vehicle, antidazzling means such as a sun visor and a transparent liquid crystal panel is transferred to a light blocking state before the vehicle enters the incident region.

As a technique for controlling the transmittance of a transparent display, known is a vehicle transparent display device that is disclosed in JP-A-2016-88187. The vehicle transparent display device controls the transmittance of a region including an attention target, to be relatively higher than that of the other region so that, on a screen of a transparent display, the region including the attention target can be seen at a brightness that is relatively higher than that of the other region.

Light that is incident on a vehicle is not limited to sunlight, but includes many kinds of light such as light that is emitted from surrounding vehicles, and light that is emitted from residential houses, factories, and the like. When only a counter measure in which the blocking region or the transmittance is automatically changed in accordance with these kinds of light is conducted, therefore, the control cannot sufficiently correspond to these kinds of light. If an occupant can manually change the blocking region or the transmittance, various kinds of light incident on a vehicle can be blocked appropriately and intuitively even when the occupant is temporarily dazzled.

It is a first object of the disclosure to provide a vehicle in which a display can be effectively viewed from a plurality of seats.

It is a second object of the disclosure to provide a vehicle and method for controlling an electronic business transaction system in which the delivery destination of an article of an electronic business transaction can be efficiently indicated.

It is a third object of the disclosure to provide a vehicle in which external incident light such as sunlight can be blocked appropriately and intuitively.

SUMMARY OF INVENTION

The vehicle of the disclosure includes: a vehicle body having a cabin; first and second seats that are placed in the cabin; a planar transparent member that is placed on a side surface of the cabin, and that separates a cabin interior and a vehicle exterior from each other; and a display device that is placed on the side surface of the cabin and along the planar transparent member, and that has a plurality of pixels, and at least a part of the display device is placed on the side surface and between the first seat and the second seat.

According to the disclosure, since at least a part of the display device is placed on the side surface of the cabin and between the first and second seats, a display can be effectively viewed from the first and second seats.

BRIEF DESCRIPTION OF DRAWINGS

FIG. 13 is a flowchart illustrating the operation of a control circuit of an in-vehicle device that is mounted on the vehicle of the second embodiment;

DETAILED DESCRIPTION OF THE EXEMPLARY EMBODIMENTS

Hereinafter, an embodiment (hereinafter, referred to as "the present embodiment") that specifically discloses the vehicle of the disclosure will be described in detail and appropriately with reference to the drawings. However, a detailed description more than necessary may be sometimes omitted. For example, in some cases, a detailed description of a matter which is already well known, and a repeated description of a substantially same configuration may be omitted. These omissions are made to avoid unnecessary redundancy of the following description, and to facilitate the understanding of those skilled in the art. It should be noted that the accompanying drawings and the following description are provided in order to allow those skilled in the art to fully understand the disclosure, and it is not intended to limit the subject matter as described in the appended claims.

Hereinafter, the present embodiment that is preferred for implementing the disclosure will be described in detail with reference to the drawings.

First Embodiment

Figure 1:
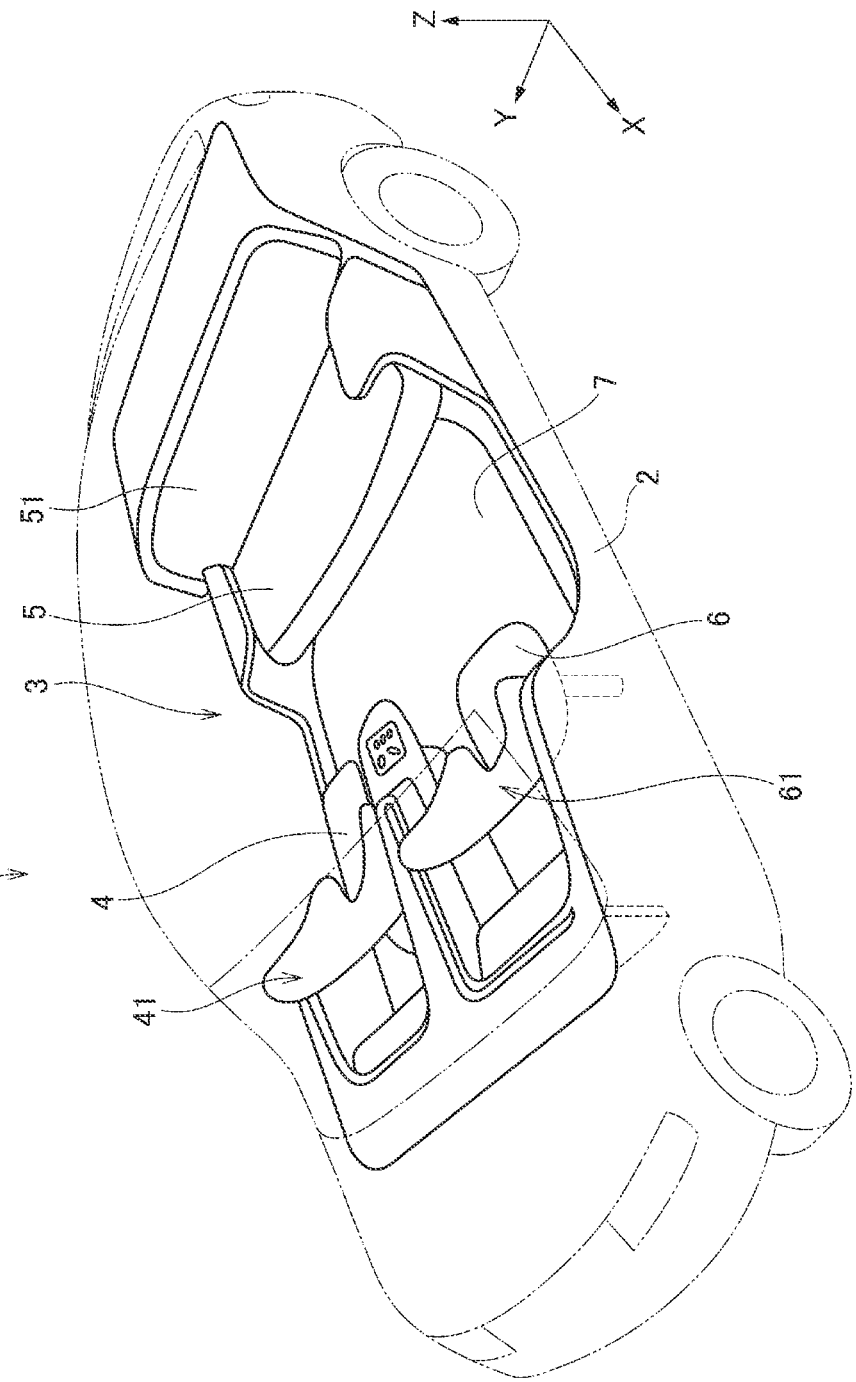
FIG. 1 is a transparent perspective view showing a vehicle of a first embodiment.
Figure 2:
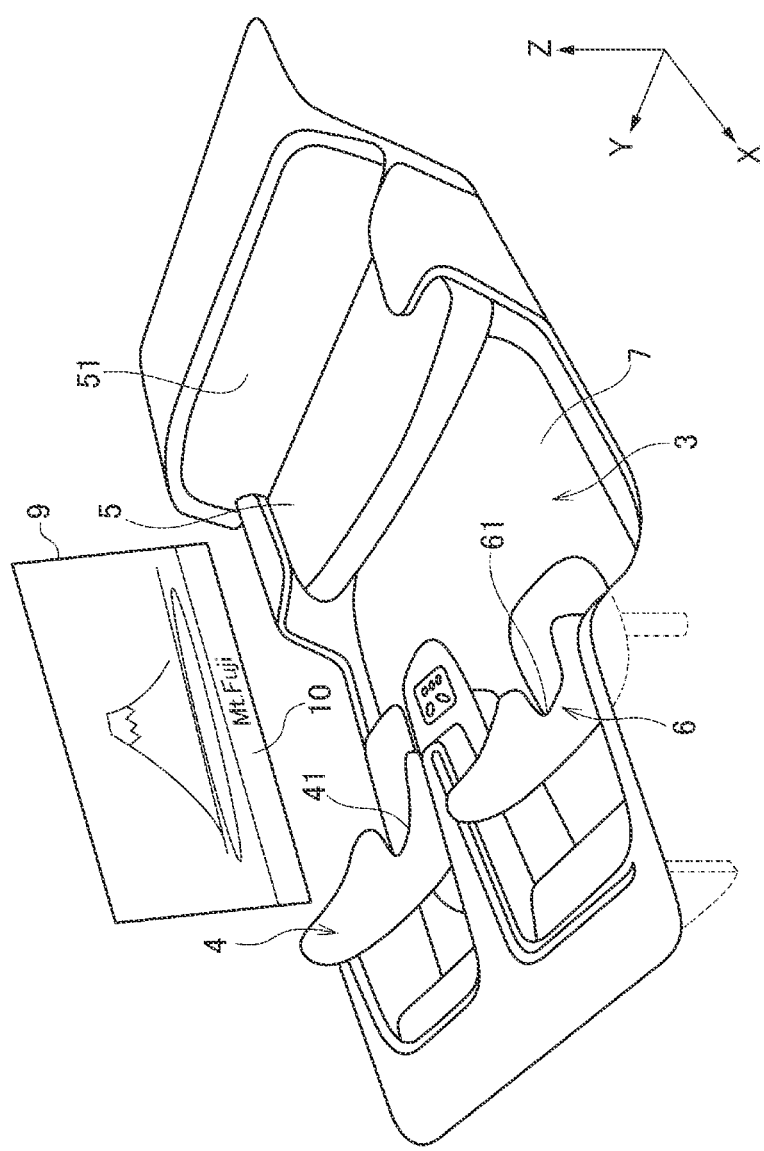
FIG. 2 is a perspective view showing a cabin of the vehicle of the first embodiment.

Hereinafter, a vehicle 1 of a first embodiment will be described with reference to FIGS. 1 and 2. FIG. 1 is a transparent perspective view showing the vehicle 1 of the first embodiment, and FIG. 2 is a perspective view showing a cabin 3 of the vehicle 1 of FIG. 1. As shown in FIG. 1, the vehicle 1 of the embodiment is an example of an automobile that is an automobile according to Japanese Road Trucking Vehicle Law, and that can automatically travel.

The vehicle 1 includes: a vehicle body 2 having the cabin 3; a first seat 4, second seat 5, and third seat 6 that are placed in the cabin 3; a floor surface 7 that constitutes a part of the cabin 3; a planar transparent member 9 that is placed on a side surface of the cabin 3, and that separates the interior of the cabin 3 and the vehicle exterior from each other; and a display device 10 that is placed on the side surface of the cabin 3 and along the planar transparent member 9, and that has a plurality of pixels.

The first seat 4 and the second seat 5 are placed along the side surface of the cabin 3. When the advancing direction of the vehicle 1 is indicated as the X-axis direction, namely, the seats are placed along the X-axis direction. The third seat 6 is placed on the left of the first seat 4 in the Y-axis direction that is perpendicular to the X-axis direction. The first seat 4 has a seat back 41, the second seat 5 has a seat back 51, and the third seat 6 has a seat back 61. Each of the first seat 4 and the third seat 6 is a one-person seat, and the second seat 5 is a multi-person seat (so-called bench seat). The first seat 4 has a rotation shaft, and can be swung about the rotation shaft so as to be directed in either of the advancing direction of the vehicle 1 and the rearward traveling direction of the vehicle 1, i.e., the direction opposed to the second seat 5. In the case where the first seat 4 and the second seat 5 are placed so as to be opposed to each other, the seat back 41 of the first seat 4, and the seat back 51 of the second seat 5 are opposed to each other.

When the seat back 41 of the first seat 4, and the seat back 51 of the second seat 5 are opposed to each other, an occupant sifting on the first seat 4 and an occupant sifting on the second seat 5 can be opposed to each other, and the occupants can converse with each other while facing each other. In the configuration where the seat back 41 of the first seat 4, and the seat back 51 of the second seat 5 are opposed to each other, it is not necessary that the occupant of the first seat 4 and the occupant of the second seat 5 directly face each other, and it is required only that they face each other in a state where they can converse or confer with each other. Also the third seat 6 may have a rotation shaft so as to be swingable, and the third seat 6 may be automatically or manually swingable.

Although, in the vehicle 1 of the present embodiment, the planar transparent member 9 and the display device 10 are placed between the first seat 4 that is on the side surface of the right side in the advancing direction of the vehicle 1, and the second seat 5, it is a matter of course that the member and the device may be placed between the third seat 6 that is on the side surface of the left side in the advancing direction of the vehicle 1, and the second seat 5. Of course, the member and the device may be placed on both the side surfaces.

Figure 3:
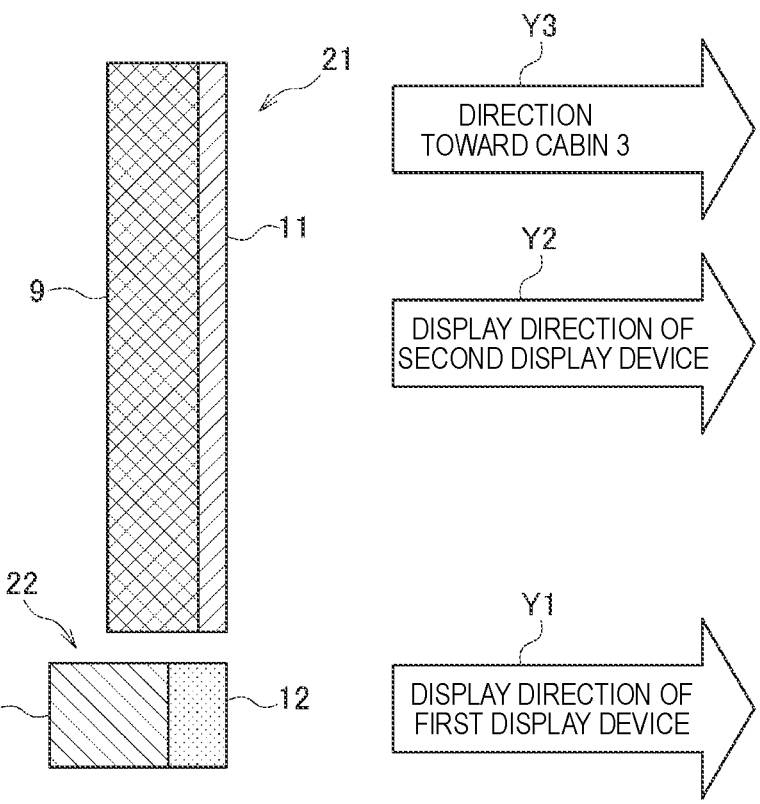
FIG. 3 is a sectional view showing a planar transparent member and display device of the vehicle of the first embodiment.

FIG. 3 is a sectional view showing the planar transparent member 9 and the display device 10. In FIG. 3, the planar transparent member 9 has a predetermined transmittance with respect to visible light. The planar transparent member 9 includes a display device 11 having a predetermined transmittance with respect to visible light, on the surface on the side of the cabin 3. The display device 11 is realized by, for example, a liquid crystal panel or an organic EL (Electro Luminescence) device. In place of the configuration where the display device 11 is stacked on the surface of the planar transparent member 9 on the side of the cabin 3, a glass plate constituting the display device 11 may be used also as the planar transparent member 9. In the following description, in order to easily distinguish the display devices 10, 11 from each other, the display device 10 is referred to as "the first display device 10," and the display device 11 is referred to as "the second display device 11." In the figure, the arrow Y1 indicates the display direction of the first display device 10, the arrow Y2 indicates the display direction of the second display device 11, and the arrow Y3 indicates the direction toward the cabin 3.

The first display device 10 is realized by a micro LED (Light emitting Diode) device, a liquid crystal panel, an organic EL device, or the like. The first display device 10 includes a sheet 12 having a predetermined transmittance with respect to visible light, on the surface on the side of the cabin 3. The sheet 12 is a decorative sheet, and has a wood-grain pattern, a carbon fiber effect, or the like. Alternatively, the sheet may be configured with a wood material. In the following description, the sheet 12 is referred to as the decorative sheet 12. The decorative sheet 12 has a predetermined transmittance with respect to visible light. Preferably, the transmittance is made smaller than the predetermined transmittance of the first display device 10. When the predetermined transmittance of the decorative sheet 12 is referred to as the first transmittance, and the predetermined transmittance of the first display device 10 is referred to as the second transmittance, namely, it is preferred that the first transmittance is smaller than the second transmittance. When the transmittance of the decorative sheet 12 is made smaller than that of the first display device 10, decorative sheet 12 is viewed harder than the first display device 10, and the decorative sheet 12 can be used as a cover for the first display device 10.

Figure 4:
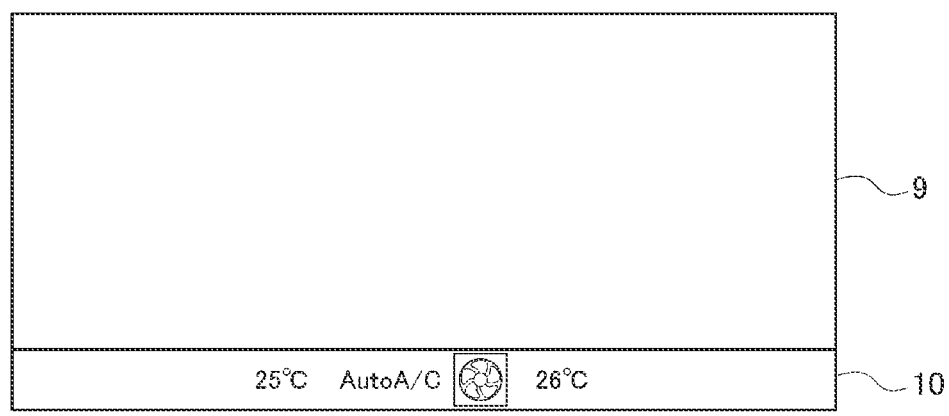
FIG. 4 is a view showing the planar transparent member of the vehicle of the first embodiment, and a first display device that is placed along the planar transparent member.

The first display device 10 includes at least 7 pixels, and therefore can display at least alphabetical or numerical information. It is a matter of course that the number of the pixels may be larger than 7. When the first display device is configured as described above, the amount of displayable information can be increased. Although the first display device 10 is placed together with the planar transparent member 9 between the first seat 4 and the second seat 5, it is requested only that at least a part of the first display device is between the first seat 4 and the second seat 5. As seen from FIG. 2, moreover, the first display device 10 is smaller in area than the planar transparent member 9, and also in vertical width than the planar transparent member 9. Information relating to the vehicle 1 can be displayed on the first display device 10. An example of the information is the set temperature of an air conditioner. FIG. 4 is a view showing the planar transparent member 9 in a state where the second display device 11 is removed away, and the first display device 10 that is placed along the planar transparent member 9. As shown in FIG. 4, information relating to the setting of the air conditioner is displayed on the first display device 10. In place of the set temperature of the air conditioner, the room temperature, the clock, information of the destination place, the estimated time of arrival to the destination place, and the like may be displayed on the first display device 10.

Figure 5:
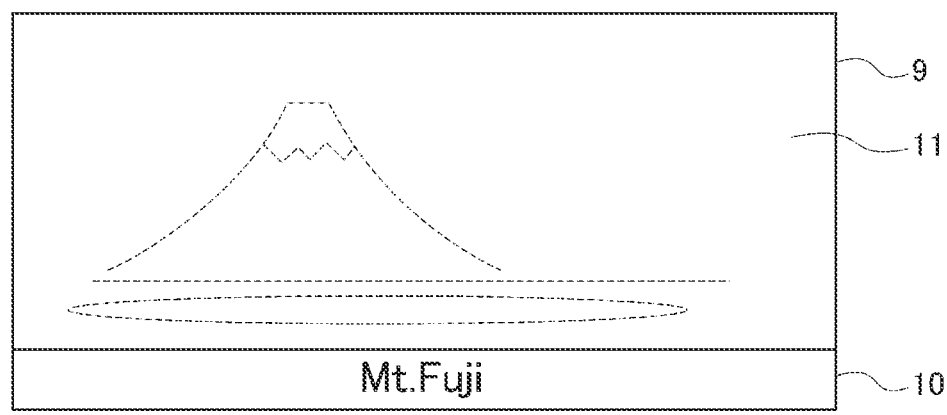
FIG. 5 is a view showing the planar transparent member of the vehicle of the first embodiment and including a second display device, and the first display device that is placed along the planar transparent member.

By contrast, predetermined contents are displayed on the second display device 11 disposed in the planar transparent member 9. When predetermined contents are displayed on the second display device 11, information relating to the predetermined contents displayed on the second display device 11 is displayed on the first display device 10. FIG. 5 is a view showing the planar transparent member 9 including the second display device 11, and the first display device 10 that is placed along the planar transparent member 9. As shown in FIG. 5, an image of Mount Fuji is displayed as the predetermined contents on the second display device 11, and information relating to Mount Fuji, i.e., the title ("Mt. Fuji") of the contents is displayed on the first display device 10.

Figure 6:
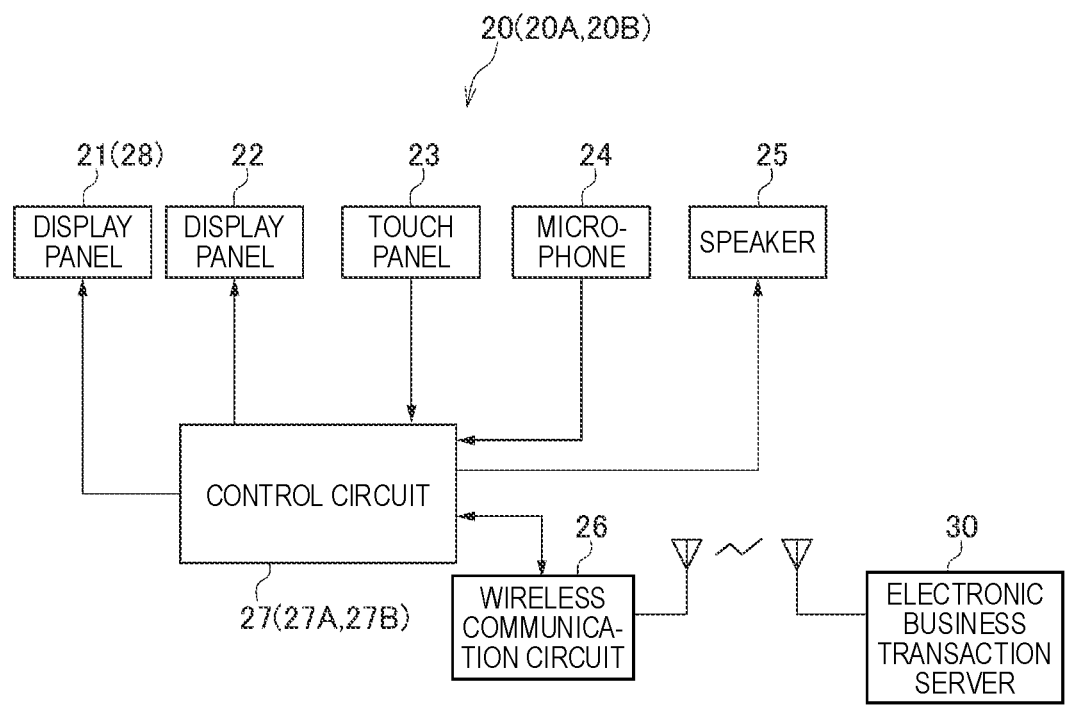
FIG. 6 is a block diagram schematically showing the configuration of an in-vehicle device that is mounted on the vehicle of the first embodiment, and that has a function of controlling a display.

FIG. 6 is a block diagram schematically showing the configuration of an in-vehicle device 20 that is mounted on the vehicle 1 of the present embodiment, and that has a function of controlling a display. In FIG. 6, the in-vehicle device 20 includes two display panels 21, 22, a touch panel 23, a microphone 24, a speaker 25, a wireless communication circuit 26, and a control circuit 27. The display panel 21 is configured with the planar transparent member 9 and the second display device 11. The display panel 22 is configured with the first display device 10 and the decorative sheet 12. Predetermined contents are displayed on the display panel 21. Information relating to the vehicle 1, and that relating to the predetermined contents are displayed on the display panel 22. The touch panel 23, the microphone 24, and the speaker 25 are not necessary in the present embodiment, and therefore their description is omitted. Also the electronic business transaction server 30 shown in FIG. 6 is not necessary in the present embodiment, and its their description is omitted.

The control circuit 27 controls various portions of the device, and includes a CPU (Central Processing Unit), ROM (Read Only Memory), RAM (Random Access Memory), interface, storage device, and the like that are not shown. Programs for controlling the CPU are stored in the ROM. The RAM functions as work memory that is used in the operation of the CPU. The interface connects the display panels 21, 22, the touch panel 23, the microphone 24, the speaker 25, and the wireless communication circuit 26 to the CPU. In the vehicle 1 of the present embodiment, the control circuit 27 is requested to control only the display panels 21, 22 and the wireless communication circuit 26, and therefore programs for controlling them are stored in the ROM. The storage device includes a storage medium such as a hard disk drive, an SSD (Solid State Drive), or a flash memory, and stores contents, information relating to the contents, and the like.

The control circuit 27 controls the wireless communication circuit 26, accesses a content server (not shown) established in a cloud through, for example, a mobile phone network (cellular network), and downloads contents, and the information relating to the contents that are stored in the content server. Then, the downloaded contents are displayed on the display panel 21, and information relating to the contents is displayed on the display panel 22. When there is information relating to the vehicle, the control circuit 27 causes the information to be displayed on the display panel 22. In the case where the occupant sets the temperature of the air conditioner mounted on the vehicle 1, for example, the control circuit 27 causes the set temperature to be displayed on the display panel 22. A temperature sensor (not shown) for detecting the cabin temperature is disposed in the cabin 3, and the temperature which is detected by the temperature sensor is displayed as the cabin temperature on the display panel 22. The display panels 21, 22 are placed on the side surface of the vehicle 1 and between the first seat 4 and the second seat 5. Therefore, the display can be effectively viewed by all occupants including not only occupants sitting on the first seat 4 and the second seat 5, respectively, but also an occupant sitting on the third seat 6.

As described above, the vehicle 1 of the first embodiment includes: the vehicle body 2 having the cabin 3; the first seat 4 and second seat 5 that are placed in the cabin 3; the planar transparent member 9 that is placed on the side surface of the cabin 3, and that separates the interior of the cabin 3 and the vehicle exterior from each other; and the first display device 10 that is placed on the side surface of the cabin 3 and along the planar transparent member 9, that has at least 7 pixels, and that can display information relating to the vehicle 1, and that relating to contents, and the first display device 10 is placed on the side surface of the cabin 3 and between the first seat 4 and the second seat 5. Therefore, the display can be effectively viewed from the first seat 4 and the second seat 5.

Moreover, the vehicle 1 of the first embodiment has, on the surface of the first display device 10, the decorative sheet 12 having a predetermined transmittance with respect to visible light. When the first display device 10 lights up, therefore, information due to the display can be provided. When the first display device 10 lights off, the first display device 10 is hidden (becomes hardly viewable), and therefore the degradation of the beauty caused by the disposition of the first display device 10 can be suppressed (namely, the beauty is prevented from being damaged).

In the vehicle 1 of the first embodiment, moreover, the transmittance (first transmittance) of the decorative sheet 12 is made smaller than the transmittance (second transmittance) of the planar transparent member, and therefore the decorative sheet 12 is viewed harder than the first display device 10. Consequently, the decorative sheet 12 can be used as a cover for the first display device 10.

In the vehicle 1 of the first embodiment, moreover, the first display device 10 is smaller in vertical width than the planar transparent member 9, and therefore the degradation of the beauty caused by the disposition of the first display device 10 can be suppressed (namely, the beauty is prevented from being damaged).

Furthermore, the vehicle 1 of the first embodiment includes, on the surface of the planar transparent member 9 on the side of the cabin 3, the second display device 11 that can display predetermined contents, and therefore predetermined contents can be easily viewed from the first seat 4 and the second seat 5. When predetermined contents are displayed on the second display device 11, information relating to the predetermined contents (for example, the title of the predetermined contents) is displayed on the first display device 10. Therefore, the second display device 11 can provide predetermined contents, and the first display device 10 can provide information relating to the predetermined contents.

Second Embodiment

Next, a vehicle of a second embodiment will be described. The vehicle of the second embodiment is similar to the above-described vehicle 1 of the first embodiment of FIG. 1, and also the cabin is similar to the cabin 3 of the vehicle 1. Therefore, FIGS. 1 and 2 are used also in the description of the embodiment. In order to distinguish from the vehicle 1 of the first embodiment, however, the vehicle of the second embodiment is denoted by the reference numeral 1A. The in-vehicle device 20 shown in FIG. 6 can be used as the in-vehicle device that is mounted on the vehicle 1A of the second embodiment. However, a part of the functions is different. Therefore, the reference numeral indicating the in-vehicle device is 20A, and that indicating the control circuit constituting the in-vehicle device 20A is 27A. The touch panel 23 of the in-vehicle device 20 shown in FIG. 6 is a touch panel included in a touch detection circuit 54 (see FIG. 7) provided in the in-vehicle device 20A of the vehicle 1A of the second embodiment.

Figure 7:
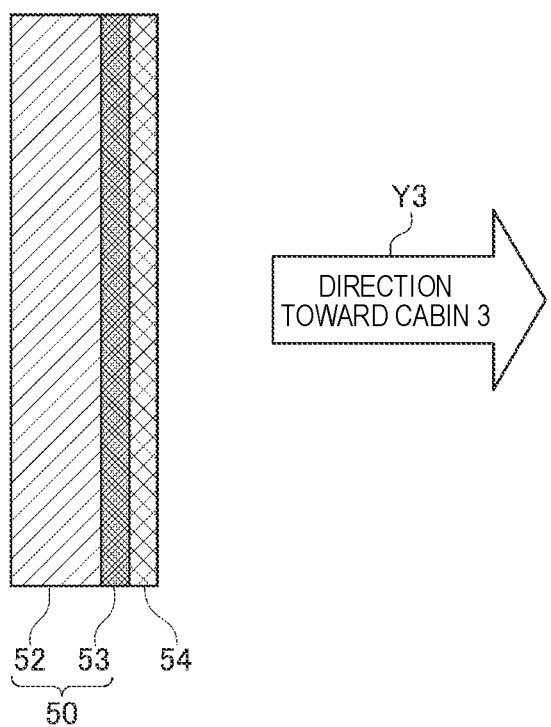
FIG. 7 is a sectional view showing a planar member and touch detection circuit of a vehicle of a second embodiment.

FIG. 7 is a sectional view showing a planar member 50 and touch detection circuit 54 of the vehicle 1A of the second embodiment. In FIG. 7, the planar member 50 separates the interior of the cabin 3 and the vehicle exterior from each other, and includes a transparent member 52 and a transmittance changing portion 53. The planar member 50 corresponds to a display panel 28 of the in-vehicle device 20 shown in FIG. 6. The display panel 21 of the in-vehicle device 20 shown in FIG. 6 includes the planar transparent member 9 and the second display device 11. By contrast, the display panel 28 is configured with the planar member 50, and includes the transparent member 52 and the transmittance changing portion 53.

Both the transparent member 52 and the transmittance changing portion 53 have a thin plate-like shape and rectangular shape, and have an approximately same size. The placement relationship of the transparent member 52 and the transmittance changing portion 53 is that the transparent member 52 is on the vehicle exterior side, and the transmittance changing portion 53 is on the interior side of the cabin 3. The arrow Y3 in FIG. 7 indicates the direction toward the cabin 3. The touch detection circuit 54 is disposed on the surface of the planar member 50 on the interior side of the cabin 3. The touch detection circuit 54 detects a touch on the planar member 50, and includes at least a touch panel that is stacked on the planar member 50. The type of the touch panel may be the capacitance type, the resistive film type, the surface acoustic wave type, or the like. Hereinafter, the description will be made assuming that the planar member 50 includes the touch detection circuit 54. Since the vehicle 1A has many curved surfaces, the planar member 50 is not always rectangular or planar.

Figure 8:
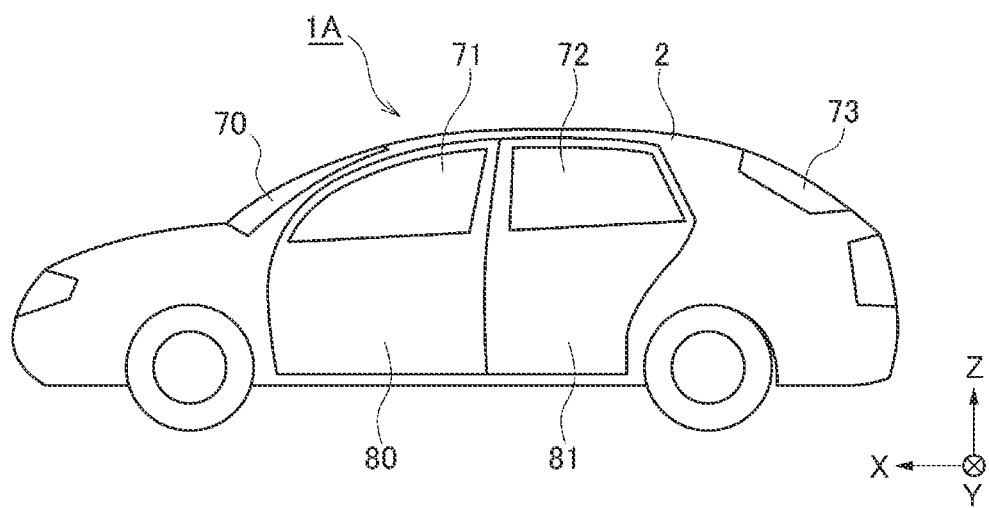
FIG. 8 is a side view showing the placement of the planar member in the vehicle of the second embodiment.

The planar member 50 is disposed in at least one of the front, rear, and side portions of the vehicle 1A. FIG. 8 is a side view showing the placement of the planar member 50 in the vehicle 1A. In FIG. 8, the planar member 50 is disposed on at least one of: a windshield 70 that is in the front portion; side glass plates 71, 72 of doors 80, 81 that are in the respective side portions; and a rear glass plate 73 that is in the rear portion.

Figure 9:
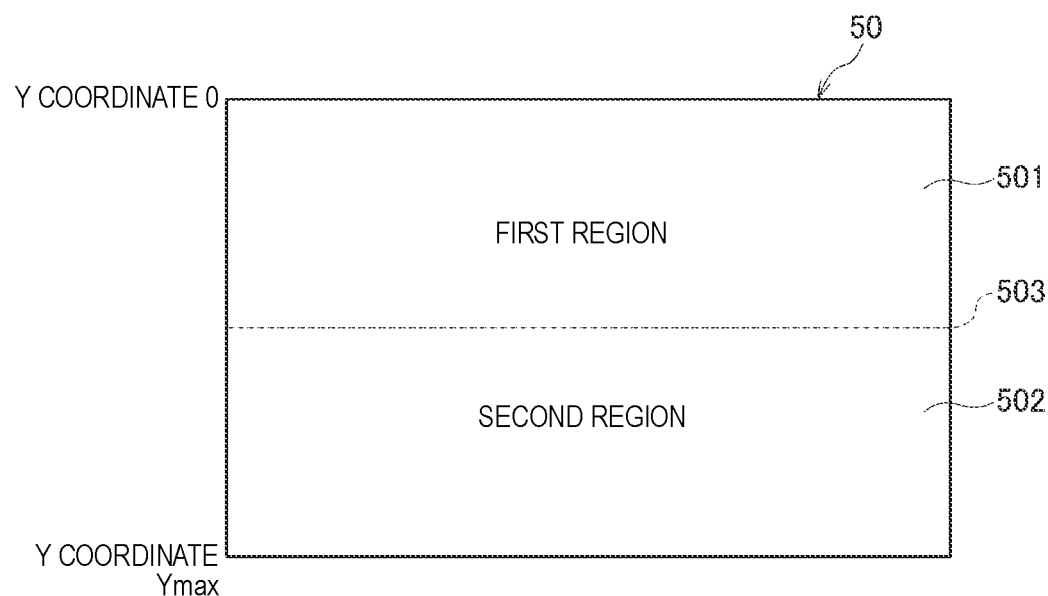
FIG. 9 is a plan view showing the planar member provided in the vehicle of the second embodiment.

The planar member 50 has at least two regions that are arranged in the vertical direction. FIG. 9 is a plan view showing the planar member 50. As shown in FIG. 9, the planar member 50 has at least a first region 501 and a second region 502, and these regions are adjacent to each other in the vertical direction. Particularly, the first region 501 is placed above the second region 502. The initial values of the areas of the first and second regions 501, 502 of the planar member 50 are equal to each other. Both the initial values of the transmittances of the first and second regions 501, 502 with respect to visible light are set to a third transmittance. For example, the third transmittance is assumed to have a value at which the largest amount of light is transmitted or the regions are approximately transparent. The transmittances of the first and second regions 501, 502 are changeable. The transmittances are changed by controlling the transmittance changing portion 53.

The in-vehicle device 20 shown in FIG. 6 can be used as the in-vehicle device that is to be mounted in the vehicle 1A of the present embodiment. However, a part of the functions is different. Therefore, the reference numeral indicating the in-vehicle device is 20A, and that indicating the control circuit constituting the in-vehicle device 20A is 27A. The touch panel 23 of the in-vehicle device 20 shown in FIG. 6 is a touch panel included in the touch detection circuit 54.

The touch corresponding to the first and second regions 501, 502 of the planar member 50 is conducted in one of following manners (1) to (3): (1) the first region 501 is touched, or the second region 502 is touched; (2) the first region 501 is touched, but the second region 502 is not touched; and (3) the first region 501 is not touched, but the second region 502 is touched.

The preparation of the plurality of kinds of touches enables one desired touch to be selected.

When the touch detection circuit 54 detects a touch on the planar member 50, the control circuit 27A controls the transmittance changing portion 53 to change the transmittances in the planar member 50. For example, it is assumed that the first region 501 of the planar member 50 is in the initial state or has the third transmittance. It is further assumed that the third transmittance is larger than the first transmittance. In the case where, during a period when the first region 501 of the planar member 50 has the third transmittance that is the initial state, the touch detection circuit 54 detects a touch corresponding to the first region 501 and the second region 502, the control circuit 27A controls the transmittance changing portion 53 so as to make the first transmittance of the first region 501 smaller than the second transmittance of the second region 502. Since the first transmittance of the first region 501 becomes smaller than the second transmittance of the second region 502, the first region 501 is darker than the second region 502. Namely, the first region 501 is bright until a touch is detected, but becomes dark when a touch is detected.

Figure 10:
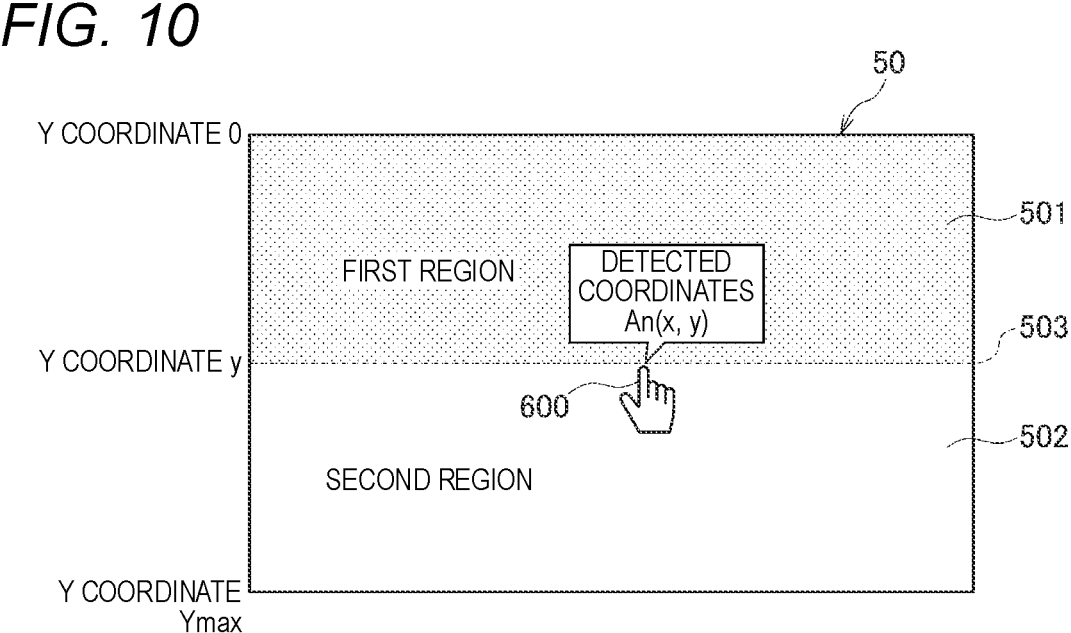
FIG. 10 is a view showing a touched state on a boundary line between first and second regions of the planar member provided in the vehicle of the second embodiment.

The third transmittance may be equal to the second transmittance. The touch corresponding to the first region 501 and second region 502 of the planar member 50 may be realized by a touch on the boundary line 503 (see FIG. 9) between the first region 501 and the second region 502. FIG. 10 is a view showing a touch on the boundary line 503 between the first region 501 and the second region 502. As shown in FIG. 10, the finger tip 600 touches on the boundary line 503. The touched position is incorporated as detected coordinates An(x, y) in the control circuit 27A. In FIG. 10, the transmittance of the first region 501 is the first transmittance, and that of the second region 502 is the second transmittance.

Figure 11:
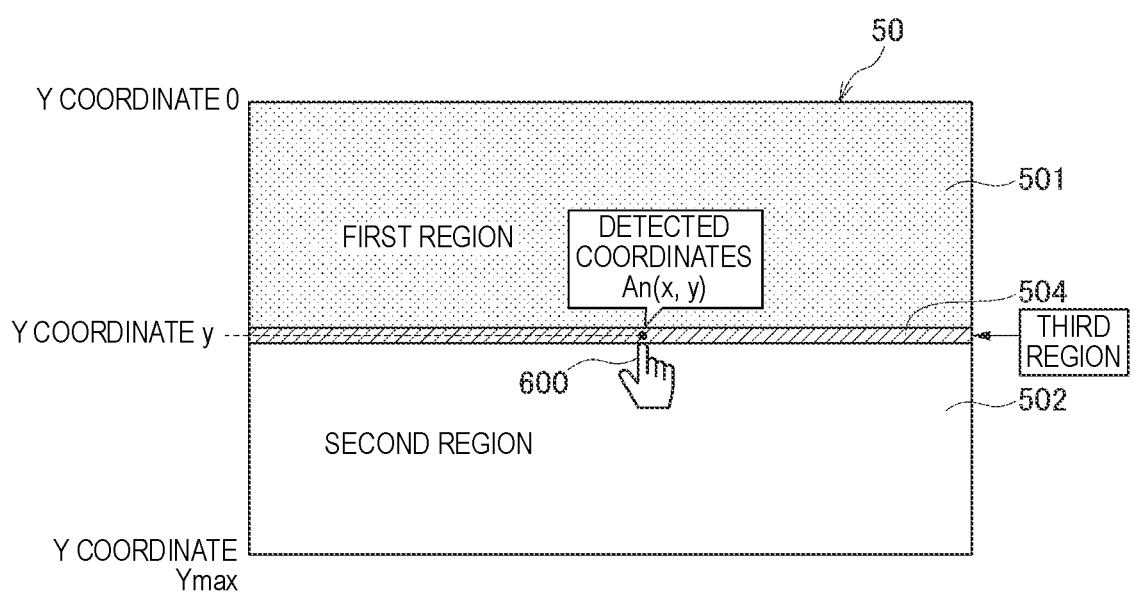
FIG. 11 is a view showing a touched state on a third region disposed between the first and second regions of the planar member provided in the vehicle of the second embodiment.

Alternatively, a third region may be disposed between the first region 501 and second region 502 of the planar member 50, and also a touch on the third region may be possible. FIG. 11 is a view showing a touched state on the third region 504 disposed between the first region 501 and the second region 502. Also in FIG. 11, the transmittance of the first region 501 is the first transmittance, and that of the second region 502 is the second transmittance.

As described above, when the touch detection circuit 54 detects a touch corresponding to the first region 501 and second region 502 of the planar member 50 (for example, a touch on the boundary line 503), the control circuit 27A controls the transmittance changing portion 53 so as to make the first transmittance of the first region 501 smaller than the second transmittance of the second region 502. When a touch operation is conducted after the control, the control circuit 27A controls the transmittance changing portion 53 so as to change the size of the first region 501 having the first transmittance.

Figure 12A:
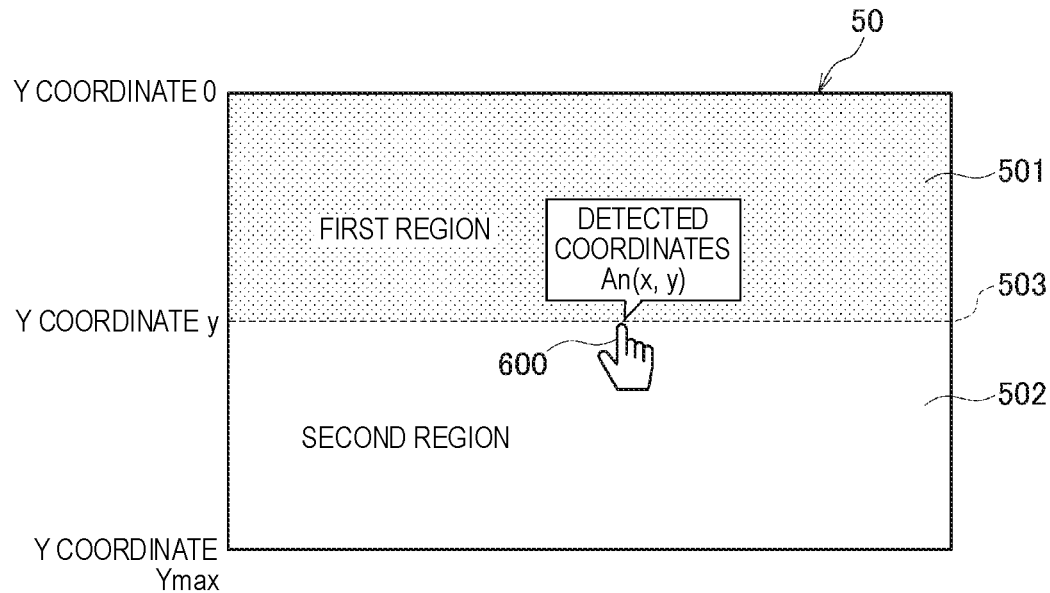
FIGS. 12A and 12B are views showing a change of the size of the first region caused by consecutive touches on the planar member provided in the vehicle of the second embodiment.
Figure 12B:
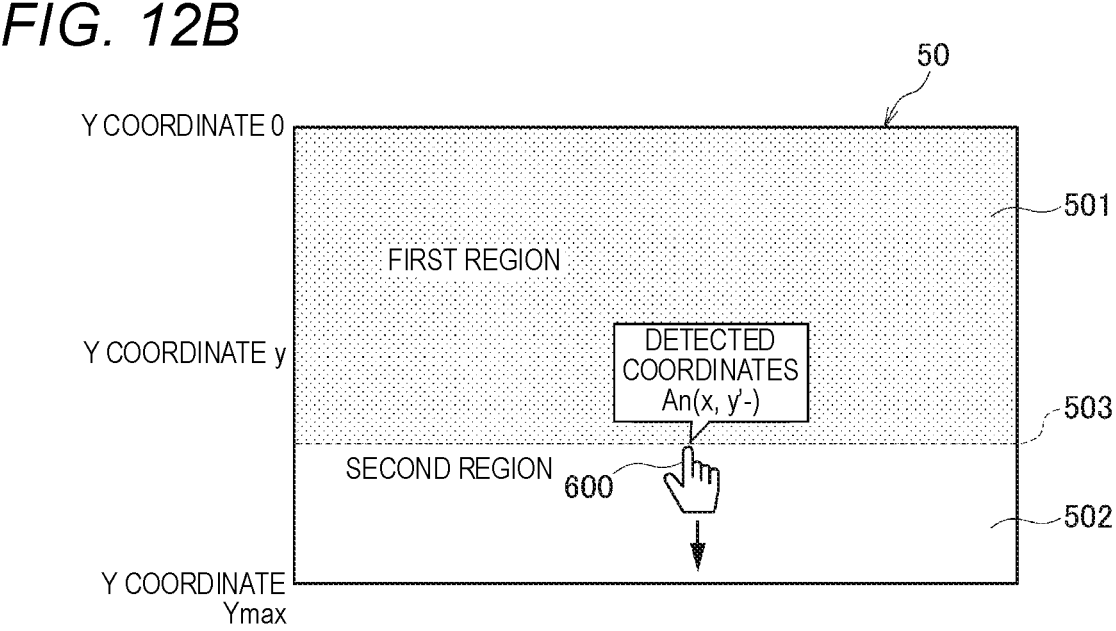

FIGS. 12A and 12B are views showing a change of the size of the first region 501 caused by consecutive touches. FIG. 12A shows a change of the size of the first region 501 caused by the initial touch, and FIG. 12B shows a change of the transmittance of the first region 501 when the finger tip 600 is downward moved from the initial touch. The initial touch causes the first region 501 to become darker than the second region 502, and, when the finger tip 600 is then downward moved, the first region 501 is gradually widened. The sliding operation is an operation called "swipe."

In addition to the sliding operation in which the finger tip 600 is moved in the touched state, the touched position can be discretely moved downward or upward.

A further operation may be possible in which, immediately after the boundary line 503 between the first region 501 and the second region 502 is touched, the touched portion is downward flicked, and the first region 501 is widened in accordance with the momentum of the motion, and which is called "flick." In the flick operation, when the touched portion is upward flicked, the first region 501 can be narrowed. The swipe operation or flick operation, which is performed starting from the boundary line 503 between the first region 501 and the second region 502, may be similarly performed starting from the third region 504 disposed between the first region 501 and second region 502.

FIG. 13 is a flowchart illustrating the operation of the control circuit 27A of the in-vehicle device 20A that is mounted on the vehicle 1A of the present embodiment. In FIG. 13, as the initial setting, the control circuit 27A sets the transmittance of the whole region (the first region 501 and the second region 502) of the planar member 50 to the third transmittance (step S1), and 0 is substituted for x and y of the variable An (x, y) indicating the input coordinates (step S2).

The control circuit 27A performs the initial setting, and detects the input coordinates through the touch panel 23 (step S3), and determines whether there is a coordinate input or not (step S4). If it is determined that there is not a coordinate input (in the case of "NO"). The control circuit 27A repeats the processes of step S3 and step S4 until a coordinate input is conducted. If there is a coordinate input (in the case of "YES"), the control circuit 27A refers toy of the variable An(x, y), sets the first region 501 that extends, in the touch panel 23, from 0 in the vertical direction to y to the first transmittance, and sets the second region 502 that extends from y to Ymax to the second transmittance (step S5). Thereafter, above-described steps S3 to S5 are repeated. In the case where the frequency of the coordinate detection is high, the touch operation, the swipe operation, and the flick operation can be expressed even by the flowchart.

As described above, in the vehicle 1A of the second embodiment, in the case where a touch on the planar member 50 that is fixed to the vehicle body 2, and that separates the interior of the cabin 3 and the vehicle exterior from each other is detected by the touch detection circuit 54, and, when a touch corresponding to the first region 501 and second region 502 of the planar member 50 is detected, the first transmittance of the first region 501 is made smaller than the second transmittance of the second region 502. Therefore, external incident light such as sunlight can be blocked appropriately and intuitively simply by touching the planar member 50.

In the vehicle 1A of the second embodiment, the first transmittance of the first region 501 of the planar member 50 can be made smaller than the second transmittance of the second region 502 of the planar member 50, by the initial detection of a touch, and the size of the first region 501 having the first transmittance can be changed by a subsequent consecutive touch operation. Therefore, the swipe operation for changing the size of the first region is enabled.

In the vehicle 1A of the second embodiment, the first region 501 and second region 502 of the planar member 50 are arranged in the vertical direction so that the first region 501 is in the upper side. Therefore, the planar member can be used as a sunshade.

In the vehicle 1A of the second embodiment, the first region 501 and second region 502 of the planar member 50 can be arranged in the lateral direction. According to the configuration, the planar member can be used in a similar manner as a curtain.

Although, in the vehicle 1A of the second embodiment, the touch on the planar member 50 is detected by using the touch panel 23, the device for detecting a touch is not limited to a touch panel. The touch detection may be optically performed by using a camera or the like.

Third Embodiment

Next, a vehicle of a third embodiment will be described. The vehicle of the third embodiment is similar to the above-described vehicle 1 of the first embodiment of FIG. 1, and the cabin is similar to the cabin 3 of the vehicle 1. Therefore, FIGS. 1 and 2 are used also in the description of the embodiment. In order to distinguish from the vehicle 1 of the first embodiment, the vehicle of the third embodiment is denoted by the reference numeral 1B. The in-vehicle device 20 shown in FIG. 6 can be used as the in-vehicle device that is mounted on the vehicle 1B of the third embodiment. However, a part of the functions is different. Therefore, the reference numeral indicating the in-vehicle device is 20B, and that indicating the control circuit constituting the in-vehicle device 20B is 27B.

The vehicle 1B of the third embodiment is a vehicle that can autonomously travel to the destination place, and, as means that is used for an electronic business transaction, includes: an output circuit that includes a display circuit having a plurality of pixels, and a speaker that can output a sound; an input circuit that includes a touch panel and a microphone to which a sound can be input; and a wireless communication circuit. The display circuit is the second display device 11 of the display panel 21, and the speaker is the speaker 25 shown in FIG. 6. The touch panel is the touch panel 23 disposed in the touch detection circuit 54. The microphone is the microphone 24 shown in FIG. 6. The display panel 21 is configured with the second display device 11 and the planar transparent member 9. The touch panel 23 included in the touch detection circuit 54 is stacked on the surface of the second display device 11 of the display panel 21.

The wireless communication circuit is the wireless communication circuit 26 shown in FIG. 6. The wireless communication circuit 26 is communicable with an external electronic business transaction server 30. The communication with the electronic business transaction server 30 may be conducted by optical communication such as Link Ray (registered trademark), in place of radio communication.

In the vehicle 1B of the third embodiment, when an occupant makes an utterance in order to purchase desired article, the utterance is picked up by the microphone 24, and then output as an audio signal. When the audio signal is introduced in the control circuit 27B, it is determined that instructions for purchasing the desired article on the electronic business transaction server 30 is issued, and the control circuit performs a process of purchasing the article with the electronic business transaction server 30. The control circuit 27B has an AI (Artificial Intelligence) function. The AI function analyzes the utterance of the occupant, and performs a process of a business transaction with the electronic business transaction server 30.

The electronic business transaction server 30 may be realized by one server, or by one logical electronic business transaction server 30 in which a plurality of severs cooperate with each other.

When the purchase of the article is determined, the control circuit 27B causes a proposal for delivery to the destination place, to be output as a voice from the speaker 25. Of course, in place of utterance, the order of the article may be performed by operating the touch panel 23. Of course, the proposal for delivery to the destination place may be performed by a display on the display panel 21, in place of an output of a voice sound from the speaker 25, or an output of a sound and a display may be simultaneously performed. The destination place may be previously set.

Figure 14A:
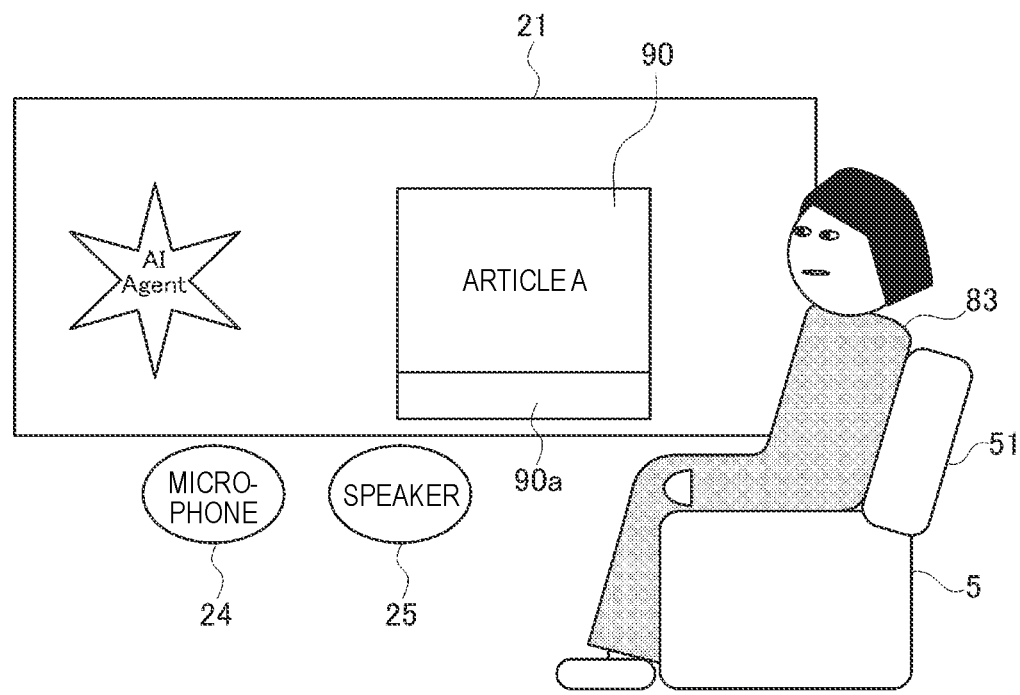
FIGS. 14A and 14B are views showing a manner of an electronic business transaction in a vehicle of a third embodiment.
Figure 14B:
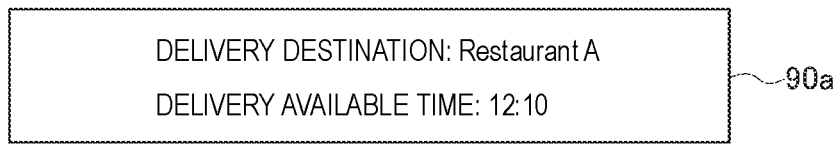

FIG. 14A is a view showing a manner of an electronic business transaction in the vehicle 1B of the third embodiment. The occupant 83 of the vehicle 1B is trying to purchase article A 90 in the state where the occupant sits on the second seat 5. When the occupant 83 makes an utterance for purchasing the desired article, the sound of the utterance is picked up by the microphone 24, and the control circuit 27B performs a process for purchasing the desired article with the electronic business transaction server 30, based on the sound picked up by the microphone 24. In the process for purchasing the article A 90, the control circuit 27B outputs a proposal for delivery to the destination place. The output of the proposal for delivery to the destination place is performed by outputting a sound from the speaker 25, or displaying the contents of the proposal on the display panel 21. In the case where the proposal for delivery to the destination place is displayed on the display panel 21, as accompanying information 90a of the article A 90, the display panel 21 may display the destination place may be displayed as the delivery destination, and the delivery available time of delivering the article A 90 to the delivery destination, i.e., the delivery deadline in the case where the article A 90 is to be delivered to the delivery destination. FIG. 14B shows an example of the accompanying information 90a of the article A 90. In the example, the delivery destination is "Restaurant A," and the delivery available time is "12:10."

After outputting the proposal for the delivery to the destination place, the control circuit 27B waits for instructions from the occupant 83 for acceptance of the proposal. The instructions is performed by making an utterance, or by operating the touch panel 23. If it is determined that instructions from the occupant 83 is not received within a predetermined time period, the control circuit 27B determines that the proposal is adopted, and proceeds with the deliver process.

Figure 15:
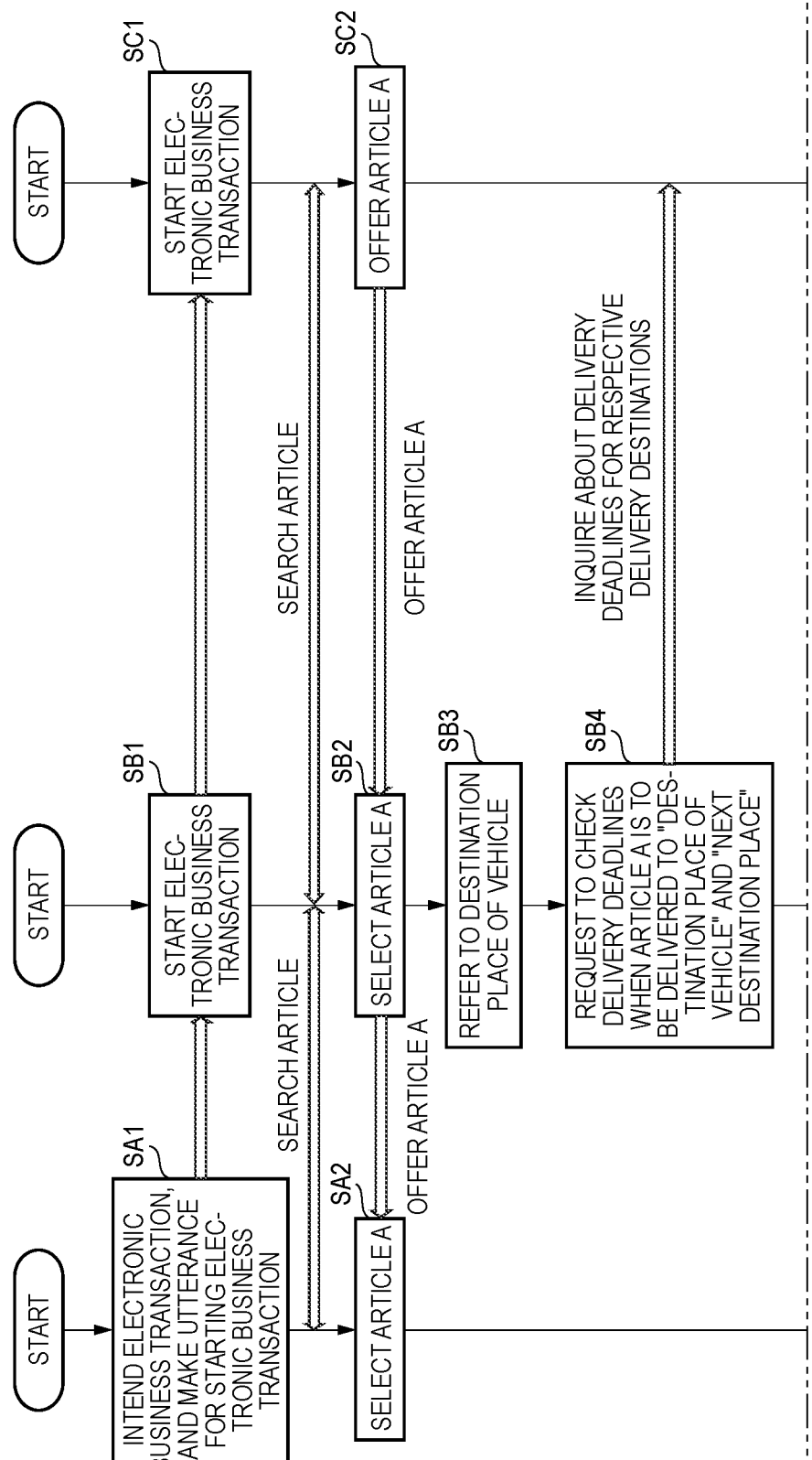
FIG. 15 is a flowchart illustrating the electronic business transaction in the vehicle of the third embodiment.
Figure 16:
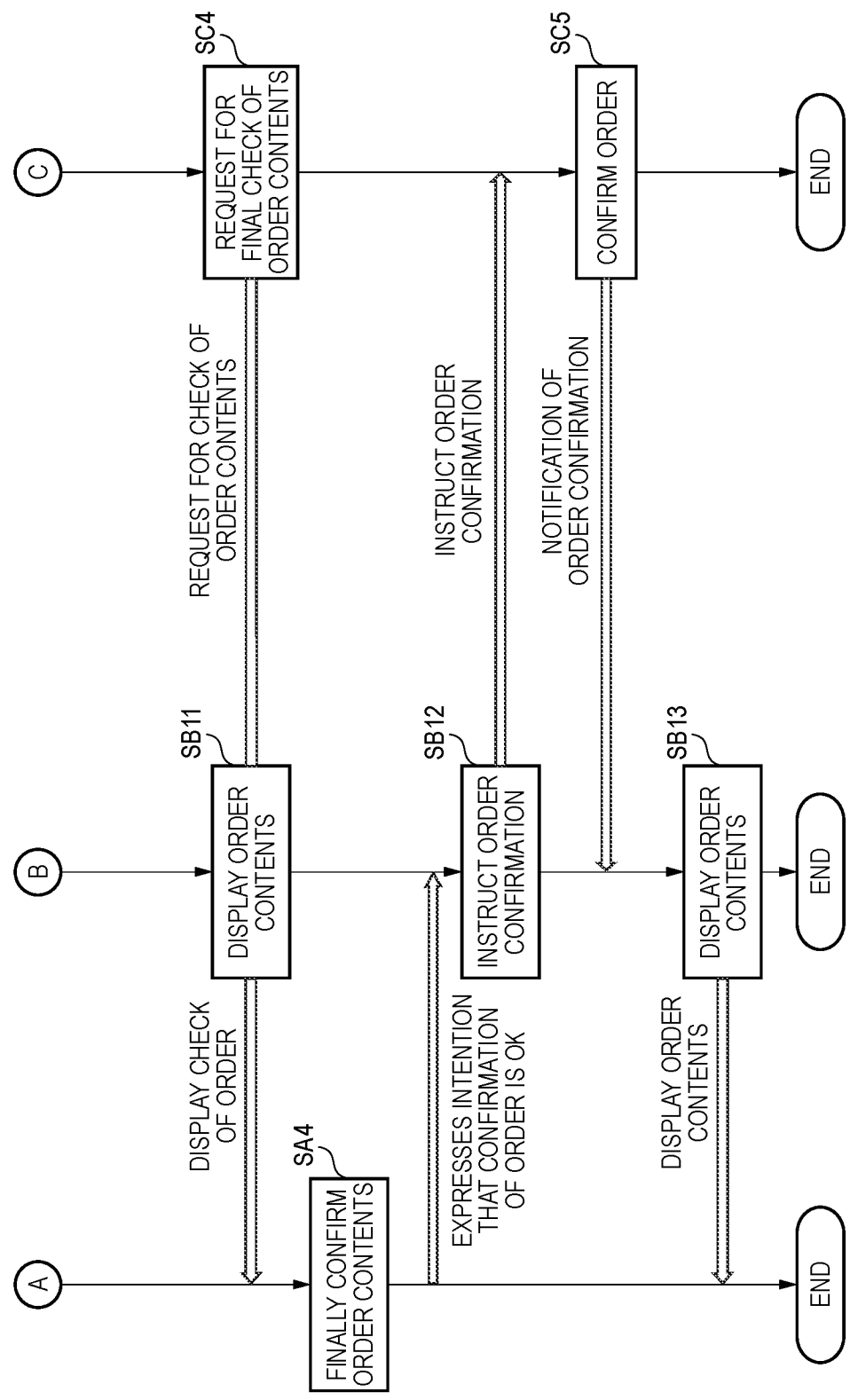
FIG. 16 is a flowchart illustrating the electronic business transaction in the vehicle of the third embodiment.

Next, processes that are performed among the occupant 83 who is the purchaser of the article, the control circuit 27B that is an AI agent on the side the vehicle 1B, and the electronic business transaction server 30 will be described in detail. FIGS. 15 and 16 are flowcharts illustrating the electronic business transaction in the vehicle 1B of the third embodiment. In the flowcharts, steps SA indicate processes performed by the occupant 83, steps SB indicate processes performed by the control circuit 27B, and steps SC indicate processes performed by the electronic business transaction server 30.

First, the occupant 83 who is the purchaser of the article intends an electronic business transaction, and makes an utterance for starting an electronic business transaction (step SA1). When the utterance for starting an electronic business transaction is made, the control circuit 27B of the vehicle 1B, and the electronic business transaction server 30 start an electronic business transaction (step SB1, step SC1). When the electronic business transaction is started between the control circuit 27B and the electronic business transaction server 30, the occupant 83 issues instructions for purchasing a desired article. Here, it is assumed that the occupant 83 designates "bouquet." The instructions for purchasing a desired article is not limited to instructions in a strict sense, but may include vague instructions such as that, in the case of a voice input, the words "I wish to purchase a bouquet." are uttered.

Then, "bouquet" is searched among the occupant 83, the control circuit 27B, and the electronic business transaction server 30. When the electronic business transaction server 30 offers an article A (step SC2), the control circuit 27B selects the article A, and offers it to the occupant 83 (step SB2). The control circuit 27B causes the offer to be output by a sound from the speaker 25, and to be displayed on the display panel 21. The occupant 83 selects the article A that is selected by the control circuit 27B (step SA2). After the control circuit 27B selects the article A, and offers it to the occupant 83, the control circuit refers to the destination place of the vehicle 1B (step SB3). Here, the vehicle 1B is an automated vehicle, and therefore the destination place is previously input. The input of the destination place may be performed during or after traveling.

After referring to the destination place of the vehicle 1B, the control circuit 27B requests the electronic business transaction server 30 to check the delivery deadlines when the article A is to be delivered to "destination place of the vehicle 1B" and "next destination place" (step SB4). Namely, the control circuit inquires the electronic business transaction server 30 about the delivery deadlines for respective delivery destinations. In response to the inquiry about the delivery deadlines for respective delivery destinations, the electronic business transaction server 30 replies the delivery deadlines when the article A is to be delivered to "destination place of the vehicle 1B" and "next destination place" (step SC3). This reply is offered to the control circuit 27B as delivery deadline information. The control circuit 27B receives the delivery deadline information that is offered from the electronic business transaction server 30, and, based on the contents of the information, determines whether the schedule of "destination place of the vehicle 1B" meets the delivery deadline or not (step SB5). If, in this determination, it is determined that the schedule of "destination place of the vehicle 1B" meets the delivery deadline (if the determination is "YES"), the control circuit 27B proposes "destination place of the vehicle 1B" as the delivery destination (step SB6). By contrast, if it is determined that the schedule of "destination place of the vehicle 1B" does not meet the delivery deadline (if the determination is "NO"), the control circuit 27B determines whether the schedule of "next destination place" meets the delivery deadline or not (step SB7).

In the determination in step SB5 whether the schedule of "destination place of the vehicle 1B" meets the delivery deadline or not, if the delivery deadline is earlier than the times when a predetermined time period elapses from the estimated times of arrival to "destination place of the vehicle 1B" and "next destination place" of the vehicle 1B, it may be determined that the delivery deadline is met. In this case, for example, the predetermined time period is a time period from 0 minute to 30 minutes, or that from 0 minute to 60 minutes.

If it is determined that the schedule of "next destination place" meets the delivery deadline (if the determination is "YES"), the control circuit 27B proposes "next destination place" as the delivery destination (step SB8). If it is determined that the schedule of "next destination place" does not meet the delivery deadline (if the determination is "NO"), the control circuit 27B proposes the occupant 83 that the delivery destinations are to be canceled (step SB9). The control circuit 27B proposes a delivery destination that is selected based on the destination place and the delivery deadline, or cancellation to the occupant 83. The control circuit 27B causes the proposal to be output by a sound from the speaker 25, and to be displayed on the display panel 21.

Alternatively, when "next destination place" is to be proposed as the delivery destination in step SB8, the proposal may be performed together with a proposal of the delivery deadline of the delivery deadline information that is offered from the electronic business transaction server 30.

The occupant 83 hears the sound of the proposal that is emitted from the speaker 25, views the proposal that is displayed on the display panel 21, and then determines the delivery destination (step SA3). Namely, the occupant determines one of "destination place of the vehicle 1B" and "next destination place." The determination is performed by making an utterance, or by operating the touch panel 23. The control circuit 27B determines the delivery destination that is determined by the occupant 83, and sends delivery destination determination information to the electronic business transaction server 30 (step SB10). Upon reception of the delivery destination determination information from the control circuit 27B, the electronic business transaction server 30 requests the control circuit 27B to perform a final check of the order contents (step SC4). When receiving the request for checking the order contents from the electronic business transaction server 30, the control circuit 27B causes the order contents to be displayed on the display panel 21 (step SB11). The occupant 83 performs the final check of the order contents displayed on the display panel 21, and, if the result is OK, expresses the intention that the confirmation of the order is OK (step SA4). The intention expression is performed by making an utterance, or by operating the touch panel 23.

When the control circuit 27B affirms the intention expression that is expressed by the occupant 83, and that indicates that the confirmation of the order is OK, the control circuit sends order confirmation instructions to the electronic business transaction server 30 (step SB12). Upon reception of the order confirmation instructions from the control circuit 27B, the electronic business transaction server 30 confirms the order, and sends a notification of order confirmation to the control circuit 27B (step SC5). When the control circuit 27B receives the notification of order confirmation from the electronic business transaction server 30, the order contents are displayed on the display panel 21 (step SB13). The occupant 83 checks the order contents displayed on the display panel 21. As a result, the order is terminated.

As described above, the vehicle 1B of the third embodiment is a vehicle that can autonomously travel to the destination place, wherein the vehicle includes: the microphone 24 and the touch panel 23; the speaker 25 and the display panel 21; the wireless communication circuit 26 that is communicable with the external electronic business transaction server 30; and the control circuit 27B, and, when the control circuit 27B receives instructions for purchasing a predetermined article on the electronic business transaction server 30, through the microphone 24 or the touch panel 23, the control circuit outputs a proposal for delivery to the destination place. Therefore, the occupant 83 who instructs the purchase of the predetermined article can know the delivery of the article to the destination place that is designated by the oneself.

The vehicle of the disclosure is useful in a vehicle that can autonomously travel to the destination place.

The embodiments of the disclosure will be summarized as follows.

There is provided a vehicle including:
a vehicle body having a cabin;
a first seat and a second seat arranged in the cabin;
a planar transparent member placed on a side surface of the cabin, and that separates an interior of the cabin and a vehicle exterior from each other; and
a display device placed on the side surface of the cabin and arranged along the planar transparent member, the display device having a plurality of pixels,
wherein at least a part of the display device is placed on the side surface and between the first seat and the second seat.

According to the disclosure, at least a part of the display device is placed on the side surface of the cabin and between the first and second seats, and therefor a display can be effectively viewed from the first and second seats.

In the vehicle above, a sheet having a predetermined transmittance with respect to visible light is provided a surface of the display device.

In the vehicle above, the sheet is a decorative sheet.

In the vehicle of the disclosure having the above-described configuration, the sheet is a decorative sheet.

According to the disclosure, the sheet is configured with a decorative sheet, and therefore the appearance can be improved.

In the vehicle above, the decorative sheet has a woodgrain pattern.

According to the disclosure, the sheet is configured with a decorative sheet having a wood effect, and therefore the appearance can be improved.

In the vehicle above, the decorative sheet is configured with a wood material.

According to the disclosure, the sheet is a decorative sheet configured with a wood material, and therefore the appearance can be improved.

In the vehicle above, the predetermined transmittance is a first transmittance,
the planar transparent member has a second transmittance with respect to visible light, and
the first transmittance is smaller than the second transmittance.

According to the disclosure, the transmittance of the sheet is made smaller than that of the planar transparent member, and therefore the display device is viewable more hardly than the planar transparent member. Consequently, the sheet can be used as a cover for the display device.

In the vehicle above, the first seat and the second seat are placed along the side surface of the cabin.

According to the disclosure, the display can be effectively viewed from the first seat and the second seat.

In the vehicle above, the first seat and the second seat are placeable so as to be opposed to each other.

According to the disclosure, occupants can face each other, and view the display while conversing with each other.

In the vehicle above, when the first seat and the second seat are placed to be opposed to each other, a seat back of the first seat, and a seat back of the second seat are opposed to each other.

According to the disclosure, occupants can sit while being opposed to each other, and therefore view the display while conversing with each other.

In the vehicle above, a number of the plurality of pixels of the display device is at least seven.

According to the disclosure, the display device can display at least alphabetical or numerical information.

In the vehicle above, an area of the display device is smaller than an area of the planar transparent member.

According to the disclosure, the degradation of the beauty caused by the disposition of the display device can be suppressed (namely, the beauty is prevented from being damaged).

In the vehicle above, the display device is smaller in vertical width than the planar transparent member.

According to the disclosure, the degradation of the beauty caused by the disposition of the display device can be suppressed (namely, the beauty is prevented from being damaged).

In the vehicle above, the display device is configured to display information relating to the vehicle.

According to the disclosure, information relating to the vehicle can be informed to all occupants.

In the vehicle above, the information relating to the vehicle is a set temperature of an air conditioner.

According to the disclosure, the set temperature of the air conditioner is configured to inform all occupants of information.

In the vehicle above, the display device is a first display device,
the vehicle further includes a second display device that can display predetermined contents, and
the first display device is configured to display information relating to the predetermined contents.

According to the disclosure, all occupants can view the predetermined contents and the information relating to the contents.

In the vehicle above, the information relating to the predetermined contents has a title of the predetermined contents.

According to the disclosure, all occupants can know the title of the predetermined contents.

In the vehicle above, the second display device is stacked on the planar transparent member.

According to the disclosure, all occupants can view the predetermined contents in the place where the planar transparent member is disposed.

In the vehicle above, the second display device has a predetermined transmittance with respect to visible light.

According to the disclosure, when the second display device lights up, information due to the display can be provided, and, when the second display device lights off, visible light is blocked, whereby the scenery outside the vehicle is hardly seen. Therefore, it is possible to block bothersome light such as sunlight and street light.

According to the disclosure, in the vehicle, the display can be effectively viewed from the plurality of seats.

There is provided a vehicle capable of autonomously travelling to a destination place, the vehicle including:
an input circuit;
an output circuit; and
a wireless communication circuit that is communicable with an external electronic business transaction server,
when the input circuit receives an instruction for purchasing an article on the electronic business transaction server, the output circuit outputs a proposal for delivery to the destination place.

According to the disclosure, when the vehicle receives instructions for purchasing a predetermined article from an occupant of the vehicle, the vehicle outputs a proposal for delivery to the destination place, and therefore the occupant can know the delivery of the article that is designated by the oneself, to the destination place.

In the vehicle above, when the input circuit receives the instruction for the purchase of the article on the electronic business transaction server, the wireless communication circuit receives information relating to a delivery deadline of a delivery in which the article is delivered to the destination place, from the electronic business transaction server, and the output circuit outputs a proposal for delivery to the destination place together with the delivery deadline.

According to the disclosure, when the vehicle receives instructions for purchasing an article from an occupant of the vehicle, the vehicle outputs a proposal for delivery to the destination place together with the delivery deadline, and therefore the occupant can know the delivery deadline of the article that is designated by the oneself, and the delivery to the destination place.

In the vehicle above, when the input circuit receives the instruction for the purchase of the article on the electronic business transaction server, the wireless communication circuit receives information relating to a delivery deadline of a delivery in which the article is delivered to the destination place, from the electronic business transaction server, and
when the delivery deadline is earlier than a time when a predetermined time period elapses from an estimated time of arrival to the destination place of the vehicle, the output circuit outputs a proposal for the delivery to the destination place.

According to the disclosure, when the vehicle receives an instruction for purchasing an article from an occupant of the vehicle, the vehicle outputs a proposal for delivery to the destination place when the delivery deadline is earlier than the time when the predetermined time period elapses from the estimated time of arrival to the destination place, and therefore the occupant can previously estimate the delivery deadline of the article that is designated by the oneself.

In the vehicle above, the output circuit includes a display circuit having a plurality of pixels.

According to the disclosure, the proposal for delivery to the destination place is displayed in characters, and therefore the occupant who instructs the purchase of the article can know the proposal of the delivery to the destination place in characters.

In the vehicle above, the output circuit includes a speaker configured to emit a sound.

According to the disclosure, the proposal of the delivery to the destination place is output by a sound, and therefore the occupant who instructs the purchase of the predetermined article can know the proposal of the delivery to the destination place through the sound.

In the vehicle above, the input circuit includes a touch panel.

According to the disclosure, the occupant can instruct a purchase of an article, through a touch operation to the touch panel.

In the vehicle above, the input circuit includes a microphone configured to collect a sound.

According to the disclosure, the occupant can instruct a purchase of an article, through a sound.

In the vehicle above, after the output circuit outputs the proposal for the delivery to the destination place, the input circuit receives an instruction for acceptance of the proposal.

According to the disclosure, with respect to a proposal of delivery to the destination place, the occupant who instructs purchase of a predetermined article can perform instructions for acceptance of the proposal, through a touch operation or a sound.

In the vehicle above, after the output circuit outputs the proposal for the delivery to the destination place, when a predetermined input is not performed within a predetermined time period, the input circuit determines that the proposal is accepted.

According to the disclosure, when there is no problem about the delivery to the destination place, no further operation is required. The delivery is then conducted, and therefore the operation can be simplified.

In the vehicle above, the destination place is settable.

According to the disclosure, the occupant who instructs purchase of an article can previously set the destination place.

There is a method for controlling an electronic business transaction system having an electronic business transaction server and a vehicle, the vehicle capable of autonomously travelling to a destination place and including an input circuit, an output circuit, and a wireless communication circuit which is communicable with the electronic business transaction server,
the method including:
when the input circuit receives an instruction for purchasing an article on the electronic business transaction server, the output circuit outputs a proposal for delivery to the destination place.

According to the disclosure, when the vehicle receives the instruction for purchasing the article from an occupant of the vehicle, the vehicle outputs a proposal for delivery to the destination place, and therefore the occupant can know the delivery of the article that is designated by the oneself, to the destination place.

In the method above, when the input circuit receives the instruction for the purchase of the article on the electronic business transaction server, the wireless communication circuit receives information relating to a delivery deadline for a delivery in which the article is delivered to the destination place, from the electronic business transaction server, and the output circuit outputs the proposal for delivery to the destination place together with the delivery deadline.

According to the disclosure, when the vehicle receives an instruction for purchasing an article from an occupant of the vehicle, the vehicle outputs a proposal for delivery to the destination place together with the delivery deadline, and therefore the occupant can know the delivery deadline of the article that is designated by the oneself, and the delivery to the destination place.

In the method above, when the input circuit receives an instruction for the purchase of the article on the electronic business transaction server, the wireless communication circuit receives information relating to a delivery deadline for a delivery in which the article is delivered to the destination place, from the electronic business transaction server, and,
when the delivery deadline is earlier than a time when a predetermined time period elapses from an estimated time of arrival to the destination place of the vehicle, the output circuit outputs a proposal for the delivery to the destination place.

According to the disclosure, when the vehicle receives the instruction for purchasing the article from the occupant of the vehicle, the vehicle outputs the proposal for delivery to the destination place in the case where the delivery deadline is earlier than the time when the predetermined time period elapses from the estimated time of arrival to the destination place, and therefore the occupant can previously estimate the delivery deadline of the article that is designated by the oneself.

In the method above, the output circuit includes a display circuit having a plurality of pixels.

According to the disclosure, the proposal for delivery to the destination place is displayed in characters, and therefore the occupant who instructs the purchase of the predetermined article can know the proposal of the delivery to the destination place in characters.

In the method above, the output circuit includes a speaker configured to emit a sound.

According to the disclosure, the proposal of the delivery to the destination place is output by the sound, and therefore the occupant who instructs the purchase of the predetermined article can know the proposal of the delivery to the destination place through a sound.

In the method above, the input circuit includes a touch panel.

According to the disclosure, the occupant can instruct a purchase of an article, through a touch operation through the touch panel.

In the method above, the input circuit includes a microphone configured to collect a sound.

According to the disclosure, the occupant can instruct a purchase of an article, through a sound.

In the method above, after the output circuit outputs the proposal for the delivery to the destination place, the input circuit is configured to receive an instruction for acceptance of the proposal.

According to the disclosure, with respect to a proposal of delivery to the destination place, the occupant who instructs purchase of a predetermined article can perform the instruction for acceptance of the proposal, through a touch operation or a sound.

In the method above, after the output circuit outputs the proposal for the delivery to the destination place, when a predetermined input is not performed within a predetermined time period, the input circuit determines that the proposal is accepted.

According to the disclosure, when there is no problem about the delivery to the destination place, no further operation is required. The delivery is then conducted, and therefore the operation can be simplified.

In the method above, the destination place is settable.

According to the disclosure, the occupant who instructs purchase of an article can previously set the destination place.

According to the disclosure, in the vehicle, the delivery destination of an article of an electronic business transaction can be efficiently indicated.

There is provided a vehicle including:
a vehicle body having a cabin;
a planar member that is fixed to the vehicle body, and that separates an interior of the cabin and a vehicle exterior from each other; and
a touch detection circuit configured to detect a touch on the planar member,
the planar member has a first region and a second region,
the first region and the second region are placed along a predetermined direction,
the first region and the second region are changeable in transmittance with respect to visible light, and
when the touch detection circuit detects a touch corresponding to the first region and the second region, a first transmittance of the first region is made smaller than a second transmittance of the second region.

According to the disclosure, a touch on the planar member that separates the cabin interior and the vehicle exterior from each other is made detectable, and, in the case where a touch corresponding to the first and second regions of the planar member is detected, the first transmittance of the first region is made smaller than the second transmittance of the second region. Therefore, external incident light such as sunlight can be blocked appropriately and intuitively.

In the vehicle above, the touch detection circuit includes a touch panel that is stacked on the planar member.

According to the disclosure, the position where the planar member is touched can be detected.

In the vehicle above, the predetermined direction is a lateral direction.

According to the disclosure, the first and second regions of the planar member are arranged in the lateral direction, and therefore the planar member can be used in a similar manner as a curtain.

In the vehicle above, the predetermined direction is a vertical direction, and
the first region is placed above the second region.

According to the disclosure, the first and second regions of the planar member are arranged in the vertical direction, and therefore the planar member can be used as a sunshade.

In the vehicle above, the touch corresponding to the first region and the second region is conducted in one of following manners (1) to (4):

(1) the first region is touched, or the second region is touched; (2) the first region is touched, but the second region is not touched; (3) the first region is not touched, but the second region is touched; and (4) a third region disposed between the first and second regions is touched.

According to the disclosure, when a plurality of kinds of touches are prepared, it is possible to select a desired one of the touches.

In the vehicle above, the first and second regions are adjacent to each other, and
the touch corresponding to the first region and second region is a touch on a boundary line between the first region and the second region.

According to the disclosure, the touch corresponding to the first and second regions can be set as a touch on a boundary line between the first and second regions.

In the vehicle above, when the touch detection circuit detects the touch corresponding to the first and second regions while the first region has a third transmittance, the first transmittance of the first region is made smaller than the second transmittance of the second region, and
the third transmittance is larger than the first transmittance.

According to the disclosure, the first region is initially bright, and, when the first and second regions are touched, made darker than the second region.

In the vehicle above, the third transmittance and the second transmittance are equal to each other.

According to the disclosure, the initial values of the transmittances of the first and second regions are made equal to each other.

In the vehicle above, when the touch detection circuit detects the touch corresponding to the first region and the second region, the first transmittance of the first region is made smaller than the second transmittance of the second region, and, when a touch operation is thereafter conducted, a size of the first region having the first transmittance can be changed.

According to the disclosure, a swipe operation or flick operation for changing the size of the first region is enabled.

In the vehicle above, when the touch detection circuit detects the touch corresponding to the first region and the second region, the first transmittance of the first region is made smaller than the second transmittance of the second region, and, when a touch operation is thereafter consecutively conducted, a size of the first region having the first transmittance is changed.

According to the disclosure, a swipe operation for changing the size of the first region is enabled.

In the vehicle above, the planar member is at least one of a transparent member that is placed in a front portion of the vehicle, a transparent member that is placed in a rear portion of the vehicle, and a transparent member that is placed in a side portion of the vehicle.

According to the disclosure, in at least one of the front, rear, and side portions of the vehicle, the first transmittance of the first region can be made smaller than the second transmittance of the second region, or the size of the first region having the first transmittance is changed.

In the vehicle above, the vehicle further includes at least one openable and closable door, and the planar member is placed in the door.

According to the disclosure, in the at least one of openable and closable doors, the first transmittance of the first region can be made smaller than the second transmittance of the second region, or the size of the first region having the first transmittance can be changed.

According to the disclosure, external incident light such as sunlight can be blocked appropriately and intuitively.

What is claimed is:

1. A vehicle comprising:
    a vehicle body having a cabin;
    a first seat and a second seat arranged in the cabin;
    a planar plate that is fixed to the vehicle body, that is arranged along an up and down direction, and that separates an interior of the cabin and a vehicle exterior from each other, a transmittance of visible light of the planar plate being changeable; and
    a touch detection circuit configured to detect a touch on the planar plate, wherein:
    when the touch detection circuit detects a touch at one position of the on the planar plate, the touch triggers an appearance of a first region and a second region of the planar plate, the first region having a first transmittance of visible light, the second region having a second transmittance of the visible light, the second transmittance being greater than the first transmittance,
    the first region and the second region are arranged along the up and down direction,
    the one position of the touch of the planar plate corresponds to the first region and/or the second region,
    while the touch detection circuit detects consecutive positions of a continuous touch on the planar plate from the one position of the touch which previously triggered the appearance of the first region and second region, each of consecutive positions of the continuous touch being aligned along the up and down direction, a boundary between the first region and the second region moves along the up and down direction on the planar plate;
    prior to the touch detection circuit first detecting the touch at the one position on the planar plate, the first region and the second region are set to a third transmittance having a value at which the largest amount of light is transmitted through the planar plate; and
    wherein the second transmittance is less than the third transmittance.

2. The vehicle according to claim 1, wherein the touch detection circuit includes a touch panel overlapping the planar plate.

3. The vehicle according to claim 1, wherein the first region is placed above the second region.

4. The vehicle according to claim 1, wherein the one position of the touch of the planar plate corresponding to the first region and/or the second region means one of (1) to (4):
    (1) the one position is in the first region, or the second region;
    (2) the one position is in the first region, but the one position is not in the second region;
    (3) the one position is not in the first region, but the one position is in the second region; and
    (4) the one position is in a third region disposed between the first and second regions is touched.

5. The vehicle according to claim 1, wherein the first and second regions are adjacent to each other, and wherein the one position of the touch of the planar plate corresponding to the first region and/or the second region, means that the one position is on the boundary line between the first region and the second region.

6. The vehicle according to claim 1, wherein the planar plate is at least one of a transparent plate that is placed in a front portion of the vehicle, a transparent plate that is placed in a rear portion of the vehicle, or a transparent plate that is placed in a side portion of the vehicle.

7. The vehicle according to claim 1, wherein the vehicle further includes at least one openable and closable door, and wherein the planar plate is placed in the at least one openable and closable door.

8. The vehicle according to claim 1, wherein while the touch detection circuit detects the touch and the consecutive positions on the planar plate, when a transition direction of the consecutive positions of the touch, corresponds to one of the at least one direction, the boundary between the first region and the second region, moves in the one of the at least one direction.

9. The vehicle according to claim 1, wherein the first region has a first rectangular shape on the planar plate, and the second region has a second rectangular shape on the planar plate.

10. A control method for vehicle, the vehicle comprising:
    a vehicle body having a cabin;
    a first seat and a second seat arranged in the cabin; a planar plate that is fixed to the vehicle body, and that separates an interior of the cabin and a vehicle exterior from each other, a transmittance of visible light of the planar plate being changeable; and
    a touch detection circuit configured to detect a touch on the planar plate,
    the control method comprising:
    triggering an appearance of a first region and a second region of the planar plate, the first region having a first transmittance of visible light, the second region having a second transmittance of the visible light, the second transmittance being greater than the first transmittance,
    the first region and the second region being arranged along at least one direction, when the touch detection circuit detects a touch at one position of the touch on the planar plate firstly, the one position of the touch of the planar plate corresponding to the first region and/or the second region; and moving a boundary between the first region and the second region, along the up and down direction on the plate, while the touch detection circuit detects consecutive positions of a continuous touch on the planar plate from the one position of the touch which previously triggered the appearance of the first region and the second region, each of consecutive positions of the continuous touch being aligned along the at least one direction;

prior to the touch detection circuit first detecting the touch at the one position of the touch on the planar plate, the first region and the second region are set to a third transmittance having a value at which the largest amount of light is transmitted through the planar plate; and wherein the second transmittance is less than the third transmittance.

11. The control method for the vehicle according to claim 10, wherein the touch detection circuit includes a touch panel overlapping the planar plate.

12. The control method for the vehicle according to claim 10, wherein one of the at least one direction is a lateral direction.

13. The control method for the vehicle according to claim 10, wherein one of the at least one direction is a vertical direction, and wherein the first region is placed above the second region.

14. The control method for the vehicle according to claim 10, wherein the one position of the touch of the planar plate corresponding to the first region and/or the second region, means one of (1) to (4):

(1) the one position is in the first region or the second region;

(2) the one position is in the first region, but the one position is not in the second region;

(3) the one position is not in the first region, but the one position is in the second region; and (4) the one position is in a third region disposed between the first and second regions is touched.

15. The control method for the vehicle according to claim 10, wherein the first and second regions are adjacent to each other, and wherein the one position of the touch of the planar plate corresponding to the first region and/or the second region, means that the one position is on the boundary line between the first region and the second region.

16. The control method for the vehicle according to claim 10, wherein the planar plate is at least one of a transparent plate that is placed in a front portion of the vehicle, a transparent plate that is placed in a rear portion of the vehicle, or a transparent plate that is placed in a side portion of the vehicle.

17. The control method for the vehicle according to claim 10, wherein the vehicle further includes at least one openable and closable door, and wherein the planar plate is placed in the at least one openable and closable door.

18. The control method for the vehicle according to claim 10, wherein while the touch detection circuit detects the continuous touch along the consecutive positions on the planar plate, when a transition direction of the consecutive positions of the continuous touch, corresponds to one of the at least one direction, the boundary between the first region and the second region, moves in the one of the at least one direction.

19. The control method for the vehicle according to claim 10, wherein the first region has a first rectangular shape on the planar plate, and the second region has a second rectangular shape on the planar plate.

* * * * *